United States Patent
Watanabe et al.

(10) Patent No.: US 8,762,669 B2
(45) Date of Patent: Jun. 24, 2014

(54) COMPUTER SYSTEM AND STORAGE MIGRATION METHOD UTILIZING ACQUIRED APPARATUS SPECIFIC INFORMATION AS VIRTUALIZATION INFORMATION

(75) Inventors: Yutaka Watanabe, Odawara (JP); Hiroshi Taninaka, Odawara (JP); Keiichi Kaiya, Hadano (JP)

(73) Assignee: Hitachi, Ltd., Tokyo (JP)

( * ) Notice: Subject to any disclaimer, the term of this patent is extended or adjusted under 35 U.S.C. 154(b) by 819 days.

(21) Appl. No.: 12/996,053

(22) PCT Filed: Nov. 16, 2010

(86) PCT No.: PCT/JP2010/006725
§ 371 (c)(1),
(2), (4) Date: Dec. 3, 2010

(87) PCT Pub. No.: WO2012/066594
PCT Pub. Date: May 24, 2012

(65) Prior Publication Data
US 2012/0124309 A1  May 17, 2012

(51) Int. Cl.
*G06F 12/16* (2006.01)
*G06F 3/06* (2006.01)
*G06F 12/00* (2006.01)

(52) U.S. Cl.
USPC ....................................................... 711/162

(58) Field of Classification Search
None
See application file for complete search history.

(56) References Cited

U.S. PATENT DOCUMENTS

| | | | |
|---|---|---|---|
| 7,263,593 B2 * | 8/2007 | Honda et al. | 711/205 |
| 2007/0192558 A1 | 8/2007 | Honda et al. | |
| 2007/0271434 A1 * | 11/2007 | Kawamura et al. | 711/165 |
| 2009/0157846 A1 | 6/2009 | Shimozono et al. | |
| 2010/0070722 A1 | 3/2010 | Otani et al. | |

FOREIGN PATENT DOCUMENTS

| | | |
|---|---|---|
| EP | 1 357 476 | 10/2003 |
| EP | 1 369 772 | 12/2003 |
| EP | 1 785 831 | 5/2007 |
| JP | 2004-227558 A | 8/2004 |
| JP | 2009-146106 A | 7/2009 |
| JP | 2010-073202 A | 4/2010 |
| WO | 2008/002766 | 1/2008 |

* cited by examiner

*Primary Examiner* — Sanjiv Shah
*Assistant Examiner* — Glenn Gossage
(74) *Attorney, Agent, or Firm* — Volpe and Koenig, P.C.

(57) ABSTRACT

A computer system and a storage migration method capable of simplifying the migration process of a storage apparatus while avoiding the performance degradation of the overall system. A management apparatus for managing data migration from a first storage apparatus to a second storage apparatus is provided. The management apparatus acquires apparatus-specific information of the first storage apparatus from the first storage apparatus and notifies the acquired apparatus-specific information to the second storage apparatus, and the second storage apparatus sets, as virtualization information, the acquired apparatus-specific information of the first storage apparatus notified from the management apparatus to a path connecting a second storage area and a second port associated with the second storage area in the second storage apparatus, and notifies the virtualization information as its own apparatus-specific information to a host computer in response to a configuration information acquisition request from the host computer.

10 Claims, 31 Drawing Sheets

| LDEV# | SIZE | AFFILIATED VDEV# |
|---|---|---|
| 0 | 128Mbyte | 0 |
| 1 | 256Mbyte | 0 |
| 2 | 128Mbyte | 2048 |
| 3 | 128Mbyte | 2048 |
| 4 | 128Mbyte | 4096 |
| 5 | 128Mbyte | 4097 |
| 6 | 128Mbyte | 4098 |
| : | : | : |

| VDEV# | TYPE | SIZE | RAID LEVEL | PGID |
|---|---|---|---|---|
| 0 | INTERNAL VOL | 384Mbyte | RAID5 | 0 |
| 2048 | EXTERNAL VOL | 256Mbyte | RAID1 | 10 |
| 4096 | EXTERNAL VOL | 128Mbyte | RAID1 | 20 |
| 4097 | EXTERNAL VOL | 128Mbyte | RAID1 | 30 |
| 4098 | EXTERNAL VOL | 128Mbyte | RAID1 | 40 |
| .. | .. | .. | .. | .. |
| 61A | 61B | 61C | 61D | 61E |

| VDEV# | EXTERNAL-SIDE APPARATUS SERIAL NUMBER | PATH# | EXTERNAL-SIDE WWPN | EXTERNAL-SIDE LUN | SELF STORAGE-SIDE PORT# | PATH STATUS |
|---|---|---|---|---|---|---|
| 2048 | PPP | 0 | A0 | 0 | 0 | NORMAL |
| 4096 | QQQ | 1 | A1 | 0 | 1 | NORMAL |
| 4097 | QQQ | 0 | B0 | 1 | 2 | NORMAL |
| 4098 | QQQ | 0 | B0 | 2 | 2 | NORMAL |
|  |  | 0 | B0 | 3 |  | NORMAL |
| .. | .. | .. | .. | .. | .. | .. |
| 62A | 62B | 62C | 62D | 62E | 62F | 62G |

| MANAGEMENT# | PRIMARY LDEV# | SECONDARY LDEV# | PAIR STATUS |
|---|---|---|---|
| 0 | 4 | 10 | PAIRING |
| 1 | 5 | 11 | PAIRING |
| 2 | 6 | 12 | SPLITTING |
| .. | .. | .. | .. |

| WWPN | HOST WWPN | LUN | VIRTUALIZATION FLAG | V_WWPN | V_ProductID | V_VendorID |
|---|---|---|---|---|---|---|
| S100 | H0 | 0 | ON | S0 | AAA | VendA |
| | H0 | 1 | ON | S0 | AAA | VendA |
| | H0 | 2 | ON | S0 | AAA | VendA |
| 64A | 64B | 64C | 64D | 64E | 64F | 64G |

64

COMPUTER SYSTEM AND STORAGE MIGRATION METHOD UTILIZING ACQUIRED APPARATUS SPECIFIC INFORMATION AS VIRTUALIZATION INFORMATION

TECHNICAL FIELD

The present invention relates to a computer system and a storage migration method and, for example, can be suitably applied to a computer system in which a host computer identifies a storage apparatus based on apparatus-specific information of such storage apparatus that is notified from that storage apparatus according to a configuration information acquisition request sent from the host computer to the storage apparatus.

BACKGROUND ART

Conventionally, in a computer system configured from a host computer, a storage apparatus and the like, when replacing a storage apparatus with a new storage apparatus, in order to switch the access destination of the host computer from the original storage apparatus (this is hereinafter referred to as the "migration source storage apparatus") to the new storage apparatus (this is hereinafter referred to as the "migration destination storage apparatus"), the setting of configuring the migration destination storage apparatus as the access destination needs to be made to the host computer. Thus, it is necessary to stop the host computer for a considerable period of time, and there is a problem in that business operations must be stopped during that time.

In order to overcome the foregoing problem, conventionally, a method of using alternate path software loaded in the host computer to dynamically switch the access path of the host computer, and migrating the storage apparatus without stopping the business operations performed with the host computer is being widely used (this is hereinafter referred to as the "first method").

Moreover, as another method, for example, PTL 1 discloses a method of providing a virtualization control device, which virtualizes a logical device in a storage apparatus and provides this to a host computer, between the host computer and the storage apparatus, and switching the virtualization target based on the virtualization control device from the logical device in the migration source storage apparatus to the logical device in the migration destination storage apparatus (this is hereinafter referred to as the "second method"), and PTL 2 and PTL 3 disclose a method of applying NPIV (N_Port_ID Virtualization) to a storage apparatus, and dynamically switching the access destination (this is hereinafter referred to as the "third method").

CITATION LIST

Patent Literature

[PTL 1] Japanese Unexamined Patent Application Publication No. 2004-227558
[PTL 2] Japanese Unexamined Patent Application Publication No. 2009-146106
[PTL 3] Japanese Unexamined Patent Application Publication No. 2010-73202

SUMMARY OF INVENTION

Technical Problem

However, according to the foregoing first method, in addition to the operation being different depending on the OS (Operating System) that is loaded in the host computer, there is a problem in that, if information such as the vendor ID and serial number which is unique to the apparatus (this is hereinafter referred to as the "apparatus-specific information") is different between the migration source and the migration destination, the alternate path function becomes inoperable.

Moreover, according to the foregoing second method, since it is necessary to perform the virtualization processing of the access path in the virtualization control device even during normal operation, there is a problem in that overhead will occur for each I/O and affect the I/O performance.

In addition, according to the foregoing third method, depending on the type of host computer OS or alternate path software, there is a problem in that the inconsistency of the apparatus-specific information of the migration source storage apparatus and the migration destination storage apparatus is detected, and in certain cases migration cannot be performed.

Accordingly, if it is possible to realize a storage migration method capable of migrating a storage apparatus based on the same operation regardless of the type of OS of the host computer, and without affecting the I/O performance during normal times, it should be possible to simplify the migration process of a storage apparatus while avoiding the performance degradation of the overall system The present invention was devised in view of the foregoing points. Thus, an object of this invention is to propose a computer system and a storage migration method capable of simplifying the migration process of storage apparatuses while avoiding the performance degradation of the overall system.

Solution to Problem

In order to achieve the foregoing object, the present invention provides a computer system including a host computer and a first storage apparatus for providing to the host computer a first storage area to be used for reading and writing data, wherein the host computer identifies the first storage apparatus based on apparatus-specific information of the first storage apparatus that is notified from the first storage apparatus in response to a configuration information acquisition request sent from the host computer to the first storage apparatus, comprising a second storage apparatus to which data stored in the first storage area of the first storage apparatus is migrated, and a management apparatus for managing data migration from the first storage apparatus to the second storage apparatus, wherein the management apparatus controls the first and/or second storage apparatus so as to synchronize a data content in the first storage area of the first storage apparatus and a data content in a second storage area of the second storage apparatus associated with the first storage area, and acquires the apparatus-specific information of the first storage apparatus from the first storage apparatus and notifies the acquired apparatus-specific information to the second storage apparatus, and wherein the second storage apparatus sets, as virtualization information, the acquired apparatus-specific information of the first storage apparatus notified from the management apparatus to a path connecting the second storage area and a second port associated with the second storage area in the second storage apparatus, and notifies the virtualization information as its own apparatus-specific information to the host computer in response to the configuration information acquisition request from the host computer.

The present invention additionally provides a storage migration method in a computer system including a host computer and a first storage apparatus for providing to the host computer a first storage area to be used for reading and writing data, wherewith the host computer identifies the first storage apparatus based on apparatus-specific information of the first storage apparatus that is notified from the first storage apparatus in response to a configuration information acquisition request sent from the host computer to the first storage apparatus, wherein the computer system comprises a second storage apparatus to which data stored in the first storage area of the first storage apparatus is migrated, and a management apparatus for managing data migration from the first storage apparatus to the second storage apparatus, and wherein the storage migration method comprises a first step of the management apparatus controlling the first and/or second storage apparatus so as to synchronize a data content in the first storage area of the first storage apparatus and a data content in the second storage area of the second storage apparatus associated with the first storage area, and acquiring the apparatus-specific information of the first storage apparatus from the first storage apparatus and notifying the acquired apparatus-specific information to the second storage apparatus, and a second step of the second storage apparatus setting, as virtualization information, the corresponding apparatus-specific information of the first storage apparatus notified from the management apparatus to a path connecting the second storage area and a second port associated with the second storage area in the second storage apparatus, and notifying the virtualization information as its own apparatus-specific information to the host computer in response to the configuration information acquisition request from the host computer.

According to the foregoing computer system and storage migration method, it is possible to cause the host computer to recognize the second storage apparatus as the first storage apparatus based on the apparatus-specific information that is notified from the second storage apparatus to the host computer in response to the configuration information acquisition request from the host computer.

In the foregoing case, with the computer system and storage migration method of the present invention, there is no need to load alternate path software in the host computer or provide a virtualization control device between the host computer and the first/second storage apparatus or apply NPIV to the first storage apparatus upon migrating the storage apparatus from the first storage apparatus to the second storage apparatus.

Thus, according to the computer system and storage migration method of the present invention, a storage apparatus can be migrated based on the same operation regardless of the type of OS of the host computer, and without affecting the I/O performance during normal times.

Advantageous Effects of Invention

According to the present invention, it is possible to realize a computer system and a storage migration method capable of simplifying the migration process of a storage apparatus while avoiding the performance degradation of the overall system.

BRIEF DESCRIPTION OF DRAWINGS

FIG. 8 is a conceptual diagram schematically showing the configuration of the virtual pool device management table.

FIG. 9 is a conceptual diagram schematically showing the configuration of the external device information table.

FIG. 10 is a conceptual diagram schematically showing the configuration of the pair management information table.

FIG. 11 is a conceptual diagram schematically showing the configuration of the path management table.

DESCRIPTION OF EMBODIMENTS

An embodiment of this invention is now explained in detail with reference to the drawings.

(1) First Embodiment

(1-1) Configuration of Computer System in Present Embodiment

Figure 1:
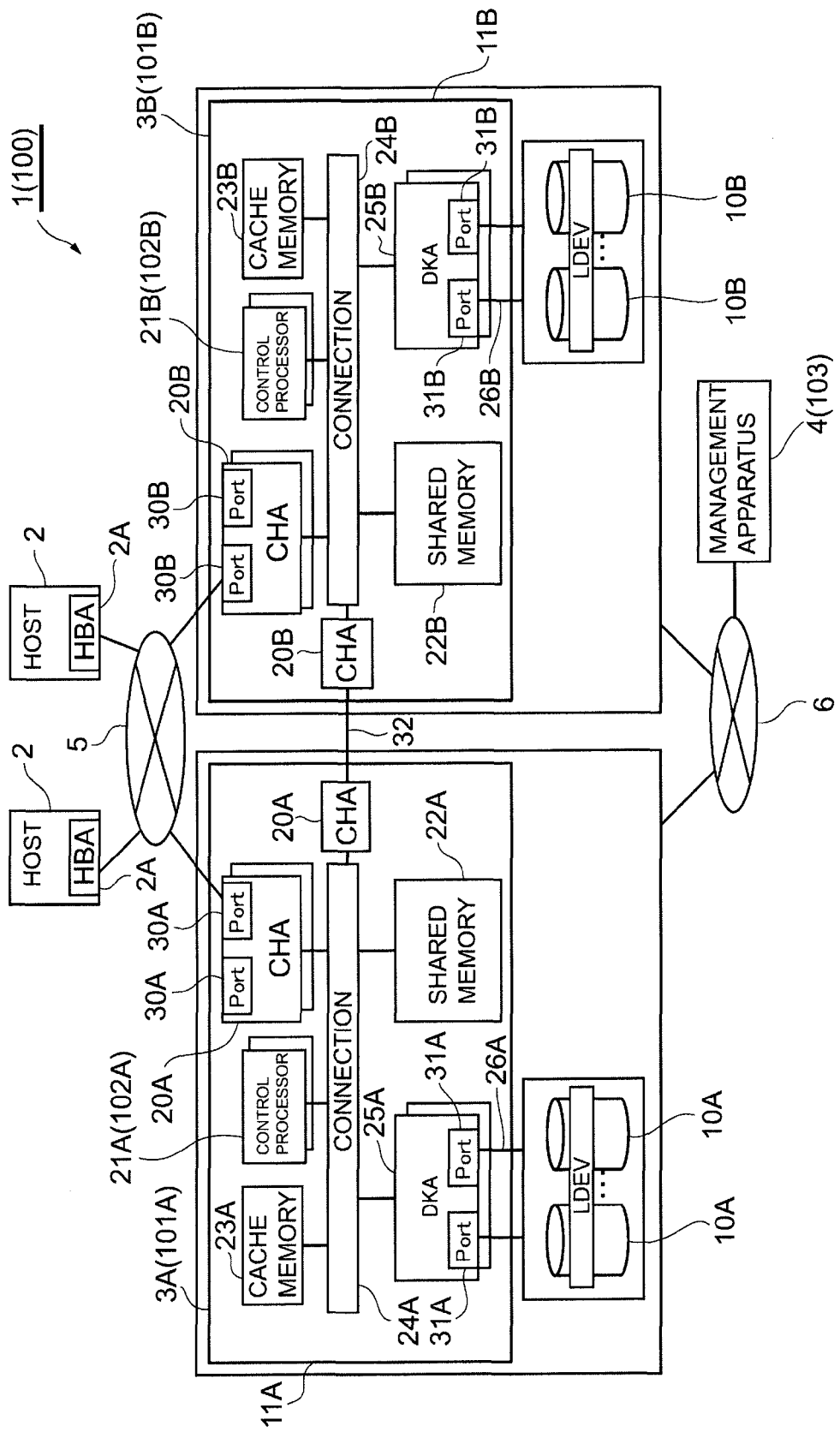
FIG. 1 is a block diagram showing the overall configuration of the computer system according to the first and third embodiments.

FIG. 1 shows the overall computer system 1 according to this embodiment. The computer system 1 comprises a plurality of host computers 2, two storage apparatuses 3A, 3B, and a management apparatus 4. The respective host computers 2 are each connected to the storage apparatuses 3A, 3B via a SAN (Storage Area Network) 5, and the two storage apparatuses 3A, 3B are connected to the management apparatus 4 via a LAN (Local Area Network) 6.

The host computer 2 is a computer device comprising information processing resources such as a processor and a memory and is configured, for example, from a personal computer, a workstation, a mainframe or the like. The host computer 2 comprises an input device such as a keyboard, a switch, a pointing device and/or a microphone, and an output device such as a monitor display and/or a speaker, and is connected to the SAN 5 via an HBA (Host Bus Adapter) 2A.

The respective storage apparatuses 3A, 3B each comprise a plurality of storage devices 10A, 10B for storing data, and a controller 11A, 11B for controlling the input and output of data to and from the respective storage devices 10A, 10B.

Among the above, the storage devices 10A, 10B are configured, for example, from an expensive disk drive such as a SCSI (Small Computer System Interface) disk, or an inexpensive disk device such as a SATA (Serial Advanced Technology (AT) Attachment) disk or an optical disk.

Figure 12:
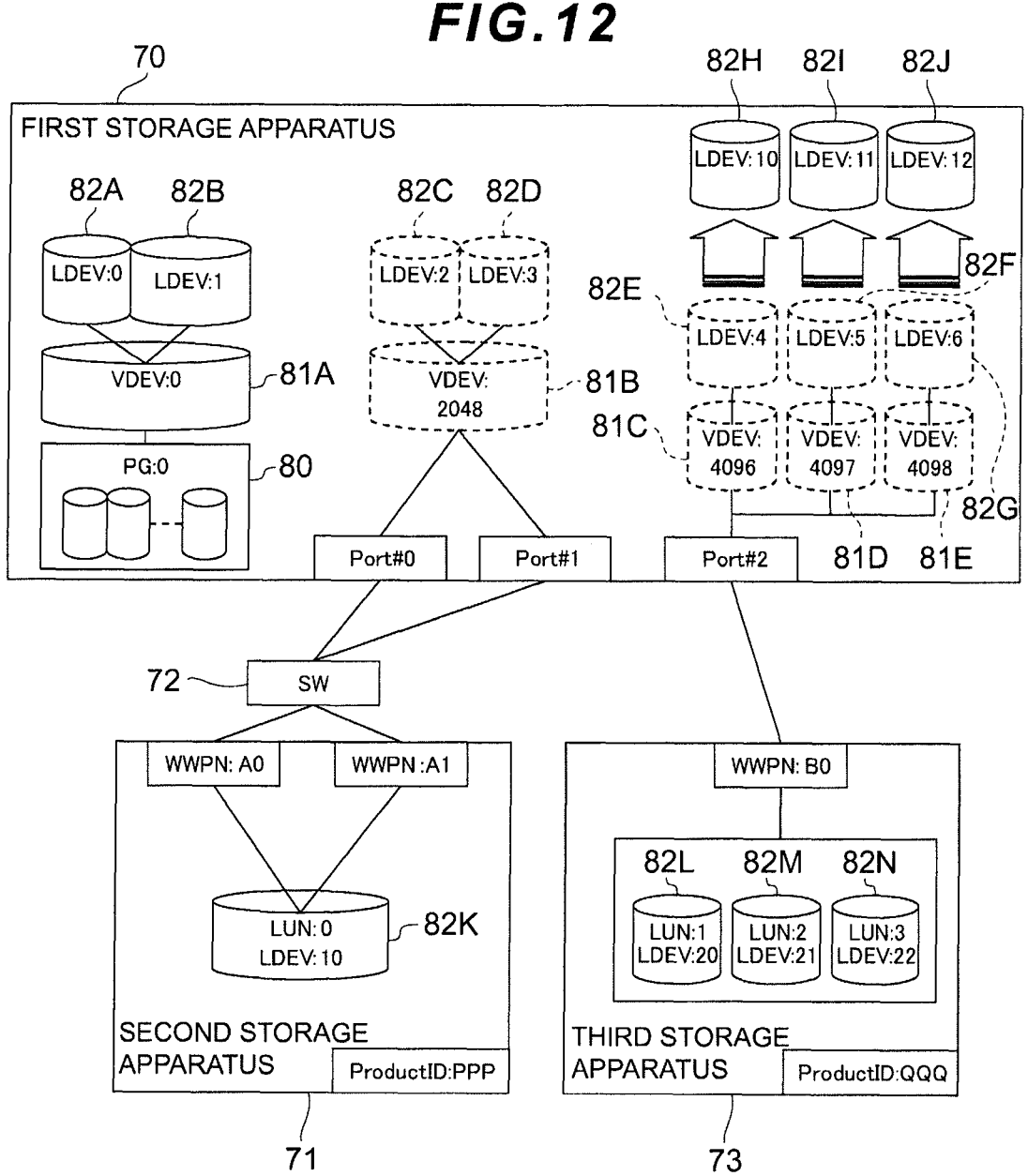
FIG. 12 is a conceptual diagram explaining respective tables.

As shown in FIG. 12, a parity group 80 is configured from one or more storage devices 10A, 10B, and a physical storage area provided by the respective storage devices 10A, 10B configuring the one parity group 80 is managed as one virtual pool device 81A. Moreover, one or more logical devices 82A, 82B are set in the virtual pool device 81A. Data is stored in the logical devices 82A, 82B in units of a block of a predetermined size (this is hereinafter referred to as the "logical block").

A unique identifier (this is hereinafter referred to as the "LUN (Logical Unit Number)") is assigned to each of the logical devices 81A, 82B. In the case of this embodiment, the input and output of data is performed by combining the LUN and a unique number (this is hereinafter referred to as the "LBA (Logical Block Address)") that is assigned to each of the logical blocks as the address, and designating such address.

Referring again to FIG. 1, the controllers 11A, 11B comprise a plurality of channel adapters 20A, 20B, a control processor 21A, 21B, a shared memory 22A, 22B, a cache memory 23A, 23B, a connection 24A, 24B, and a plurality of disk adapters 25A, 25B.

Each channel adapter 20A, 20B is an interface for performing protocol control during the communication with the host computer 2, and comprises one or more ports 30A, 30B for connecting to the SAN 5. Each port 30A, 30B is assigned with an IP (Internet Protocol) address or a network address such as WWN (World Wide Name) for identifying the respective ports.

The control processor 21A, 21B is processor that governs the operational control of the overall storage apparatus 3A, 3B. Various types of processing are executed by the overall storage apparatus 3A, 3B as a result of the control processor 21A, 21B executing the various programs stored in the shared memory 22A, 22B.

The shared memory 22A, 22B and the cache memory 23A, 23B are storage memories to be shared by the channel adapter 20A, 20B and the disk adapter 25A, 25B. The shared memory 22A, 22B is primarily used for storing various programs and various types of control information. Moreover, the cache memory 23A, 23B is primarily used for temporarily storing data to be read from and written into the storage device 10A, 10B.

The connection 24A, 24B is connected to the channel adapter 20A, 20B, the control processor 21A, 21B, the shared memory 22A, 22B, the cache memory 23A, 23B and the disk adapter 25A, 25B. The sending and receiving of data and commands among the channel adapter 20A, 20B, the control processor 21A, 21B, the shared memory 22A, 22B, the cache memory 23A, 23B and the disk adapter 25A, 25B are performed via the connection 24A, 24B. The connection 24A, 24B is configured, for example, from a switch such as an ultrafast crossbar switch or a bus for performing data transmission by way of high-speed switching.

Each disk adapter 25A, 25B is an interface for performing protocol control during the communication with the storage device 10A, 10B, and, for example, is connected to the corresponding storage device 10A, 10B via the fibre channel cable 26A, 26B. Each disk adapter 25A, 25B comprises one or more ports 31A, 31B for connecting the fibre channel cable 26A, 26B. Each port 31A, 31B is assigned with an IP address or a network address such as WWN for identifying the respective ports.

Note that, in FIG. 1, one storage apparatus 3A of the two storage apparatuses 3A, 3B is the existing storage apparatus, and the other storage apparatus 3B is the new storage apparatus to be installed in substitute for the existing storage apparatus 3A. The two storage apparatuses 3A, 3B are connected via the cable 32, and it is thereby possible to migrate data stored in the one storage apparatus 3A to the other storage apparatus 3B via the cable 32. Note that, in the ensuing explanation, the one storage apparatus 3A is referred to as the "migration source storage apparatus 3A" and the other storage apparatus 3B is referred to as the "migration destination storage apparatus 3B."

The management apparatus 4 is configured, for example, from a general-purpose server apparatus, and is connected to the migration source storage apparatus 3A and the migration destination storage apparatus 3B via the LAN 6. The management apparatus 4 comprises, in addition to information processing resources such as a CPU (Central Processing Unit), a ROM (Read Only Memory) and a RAM (Random Access Memory), a display device for displaying a UI (User Interface) screen and various types of information for making various settings to the migration source storage apparatus 3A and the migration destination storage apparatus 3B, an input device such as a keyboard or a mouse to be used by an operator for performing various operations and various inputs for settings, and a communication device for communicating with the migration source storage apparatus 3A and the migration destination storage apparatus 3B via the LAN 6. Various types of processing are executed by the overall management apparatus 4 as described later as a result of the CPU executing the corresponding programs stored in the ROM and the like based on the respective commands that are input via the input device.

(1-2) Storage Migration Processing

The processing routine of the storage migration processing to be executed upon migrating (exchanging) the storage apparatus in the computer system 1 from the existing storage apparatus 3A to the newly installed storage apparatus 3B is now explained. In line with this, the same-chassis internal copy function and the external connection function are foremost explained.

(1-2-1) Same-Chassis Internal Copy Function

The same-chassis internal copy function is a copy function of creating a mirror of a logical device in the same storage apparatus without going through a host computer as a host system.

Figure 2:
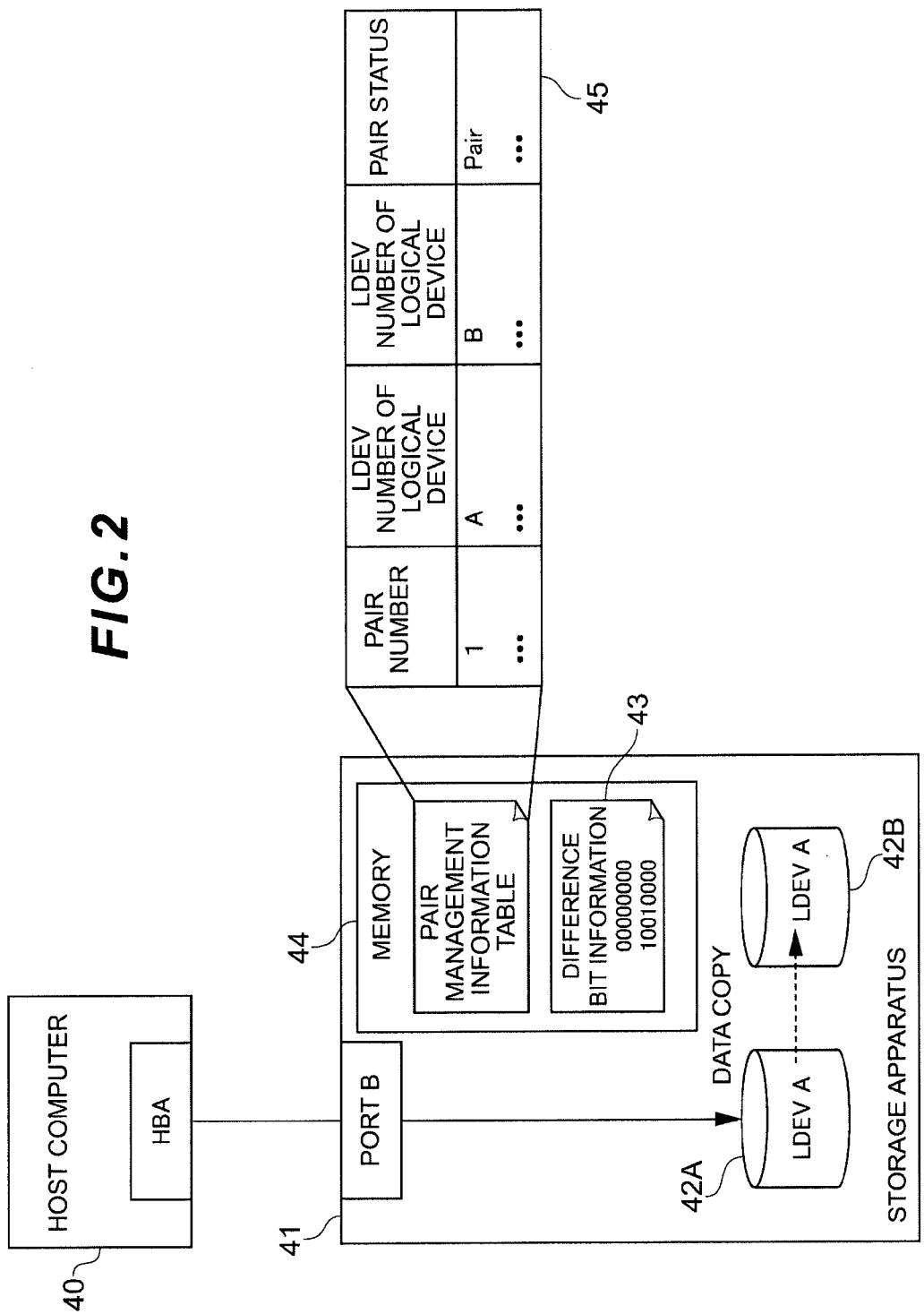
FIG. 2 is a conceptual diagram explaining the same-chassis internal copy function.

With the storage apparatus 41 (FIG. 2) equipped with the same-chassis internal copy function, upon executing the same-chassis internal copy function, as shown in FIG. 2, as a result of preliminarily copying the data stored in the logical device (this is hereinafter referred to as the "primary logical device") 42A as the copy source to the logical device (this is hereinafter referred to as the "secondary logical device") 42B as the copy destination of the two logical devices 42A, 42B configured as a copy pair (this is hereinafter referred to as the "pair configuration"), the contents of the primary logical device 42A and the secondary logical device 42B are made to be the same.

When a data write request is subsequently issued from the host computer 40 to the primary logical device 42A, the storage apparatus 41 writes the data in the designated address of the primary logical device 42A according to the write request, and additionally writes the same data, synchronously or asynchronously, in the corresponding address of the secondary logical device 42B.

Moreover, when a data write request is subsequently issued from the host computer 40 to the primary logical device 42A in a state where the mirror of the primary logical device 42A and the secondary logical device 42B is cancelled and a snapshot is created, the storage apparatus 41 writes the write target data in the primary logical device 42A, and additionally stores the migration location of that data.

As a means for achieving the above, the storage apparatus 41 retains, in the memory 44, a bit sequence of the same number of bits as the number of logical blocks in the primary logical device 42A as difference bit information 43B, and manages the difference between the primary logical device 42A and the secondary logical device 42B by setting the value of the corresponding bit of the difference bit information 43B to "0" for logical blocks in which the contents of the primary logical device 42A and the secondary logical device 42B are the same, and setting the value of the corresponding bit to "1" for the logical blocks in which the contents of the primary logical device 42A and the secondary logical device 42B are different.

Meanwhile, in the foregoing same-chassis internal copy function, as the copy pair status (this is hereinafter referred to as the "pair status"), there are the three types of "pair," "copy" and "split." The storage apparatus 41 equipped with the same-chassis internal copy function manages the pair-configured primary logical device 42A and secondary logical device 42B by using the logical device number of the primary logical device 42A and the secondary logical device 42B, the current pair status of the primary logical device 42A and the secondary logical device 42B, and the pair management information table 43A stored in the memory 44.

In the foregoing case, the pair status of "pair" is a status where the data copy from the primary logical device 42A to the secondary logical device 42B is complete and the primary logical device 42A and the secondary logical device 42B are mirrored. During this pair status, when data is written into the primary logical device 42A, the same data is simultaneously written into the corresponding block of the secondary logical device 42B. Further, during this pair status, since the contents of the primary logical device 42A and the secondary logical device 42B are equivalent, all bits of the difference bit information 43B will constantly be "0".

The pair status of "copy" is a status where the data copy from the primary logical device 42A to the secondary logical device 42B is midway, and the primary logical device 42A and the secondary logical device 42B are not yet mirrored. During this pair status, when data is written into the primary logical device 42A, the same data is simultaneously written into the corresponding location of the secondary logical device 42B on the one hand, and the data copy of blocks set with "1" of the difference bit information 43B is concurrently performed between the primary logical device 42A and the secondary logical device 42B on the other.

The pair status of "split" is a status where data is not written into the secondary logical device 42B, and a snapshot of a certain point in time is created by the secondary logical device 42B. During this pair status, data is not written into the secondary logical device 42B even if data is written into the primary logical device 42A, and "1" is set to the corresponding bits of the difference bit information 43B.

Figure 3:
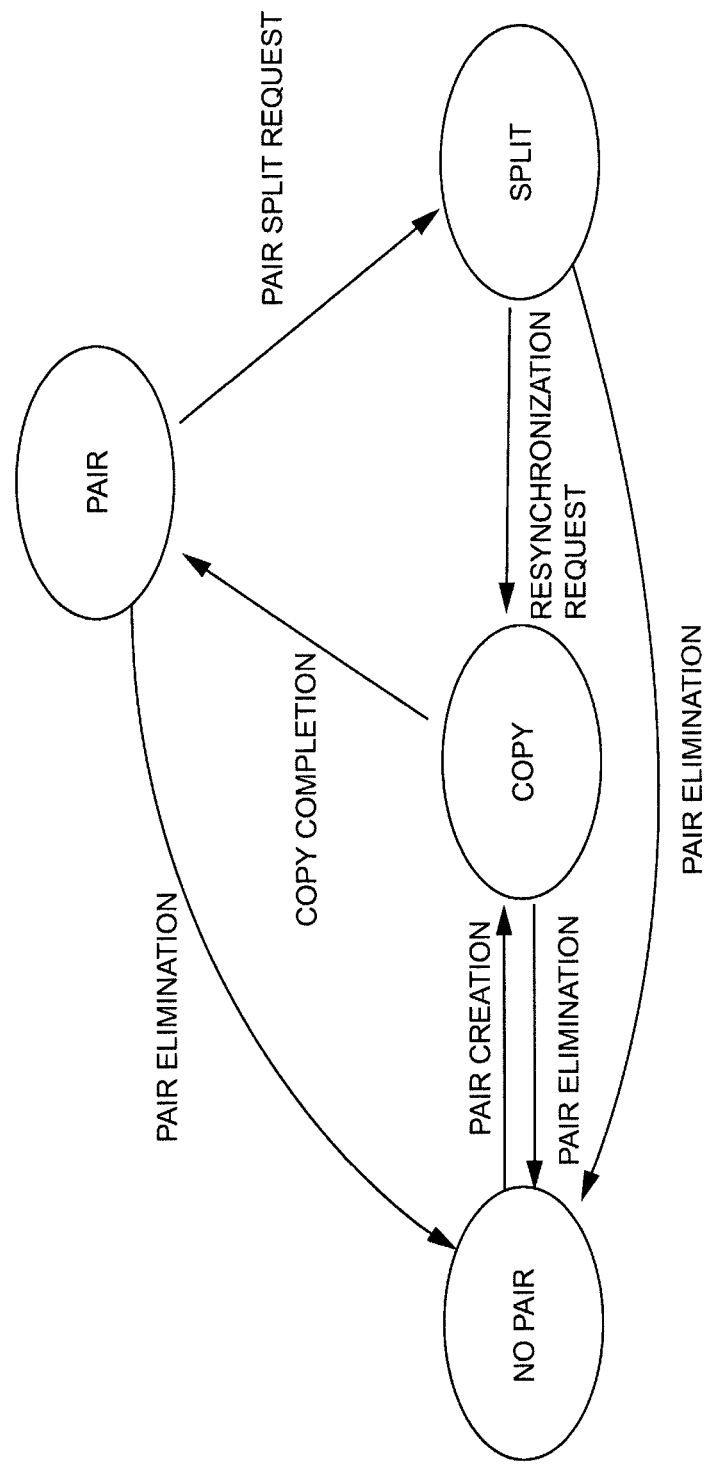
FIG. 3 is a conceptual diagram explaining the same-chassis internal copy function.

FIG. 3 shows the transition of the respective pair statuses of "pair," "copy" and "split," and the pair status ("no pair") with no pair configuration. As evident from FIG. 3, when the two logical devices 42A, 42B are pair-configured from a pair status of "no pair," the pair status of that pair changes to "copy," and, when the subsequent data copy from the primary logical device 42A to the secondary logical device 42B is complete, the pair status changes to "pair."

When a pair split request is issued to the storage apparatus 41 from a pair status of "pair," the pair status of the primary logical device 42A and the secondary logical device 42B will become "split," and the pair status can be changed once again to "copy" by issuing a resynchronization request from the pair status of "split." Note that, in each case of "pair," "copy" and "split," the pair status can be changed to "no pair" by eliminating the pair.

(1-2-2) External Connection Function

Meanwhile, the external connection function is a function of virtualizing a logical device (this is hereinafter referred to as the "external device") set in another storage apparatus as though it is a logical device (this is hereinafter referred to as the "internal device") in the self storage apparatus, and providing this to the host computer.

Figure 4:
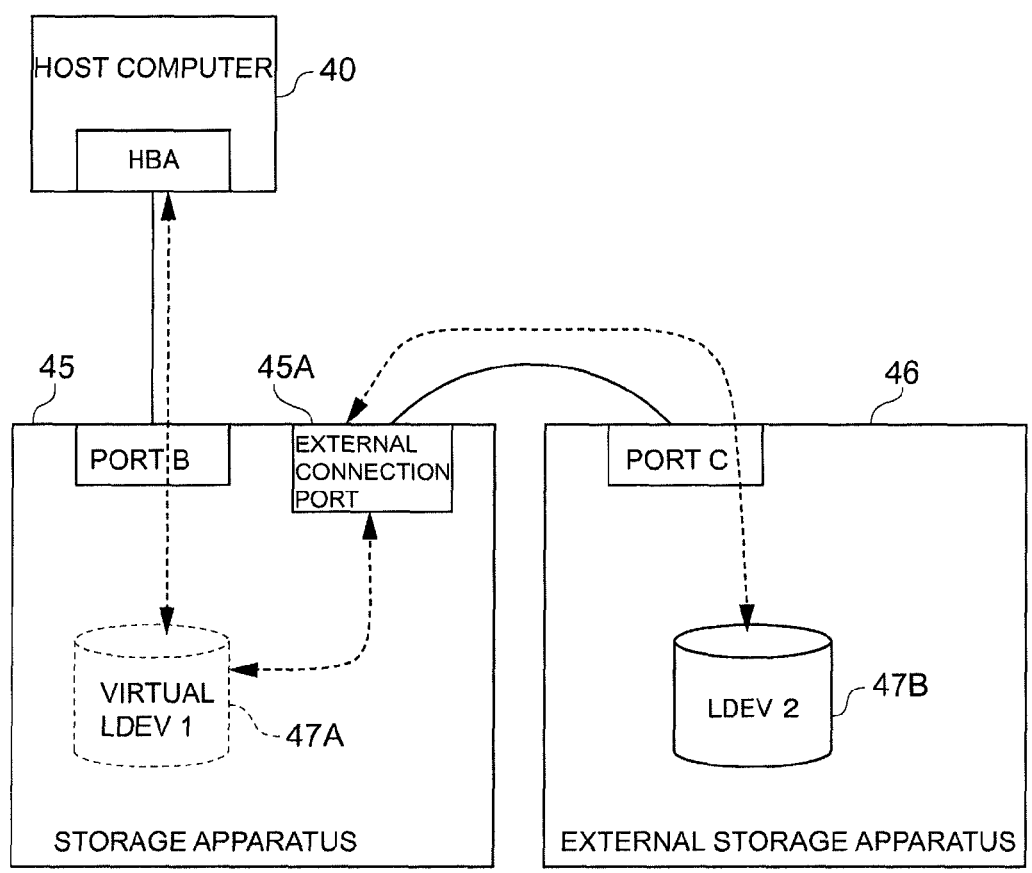
FIG. 4 is a conceptual diagram explaining the external connection function.

The storage apparatus 45 (FIG. 4) equipped with the external connection function, upon executing the external connection function, as shown in FIG. 4, provides a virtual logical device (this is hereinafter referred to as the "virtual device") 47A to the host computer 40, and maps the logical device 47B in the external storage apparatus 46, which is connected to the external connection port 45A, to the virtual device 47A.

When the storage apparatus 45 receives a data I/O request from the host computer 40 for performing data I/O to the virtual device 47A, the storage apparatus 45 issues a corresponding data I/O request to the external storage apparatus 46 via the external connection port 45A. Consequently, the corresponding data is read from or written into the corresponding logical block in the logical device 47B of the external storage apparatus 46. Accordingly, the access from the host computer 40 to the virtual device 47A will actually be made to the logical device 47B in the external storage apparatus 46.

(1-2-3) Outline of First Storage Migration Method and Table Configuration

Figure 5:
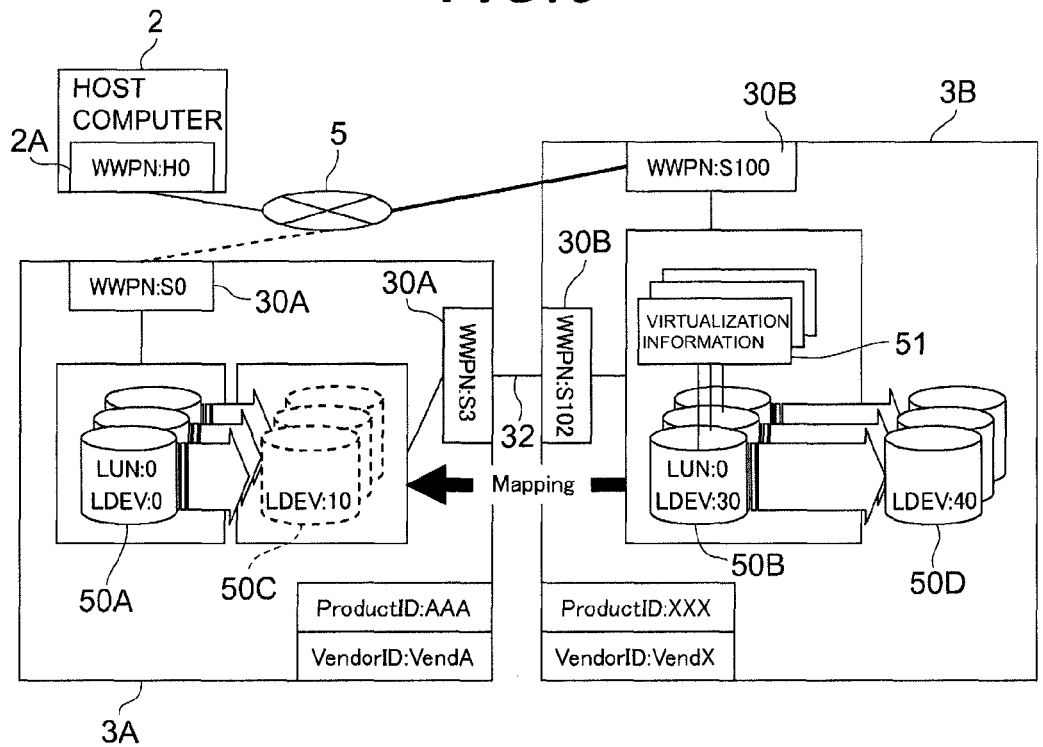
FIG. 5 is a conceptual diagram explaining the storage migration method according to the first embodiment.

FIG. 5 shows the outline of the storage migration method according to the first embodiment which combines the foregoing same-chassis internal copy function and the external connection function (this is hereinafter referred to as the "first storage migration method"). The ensuing explanation is provided on the assumption that both the migration source storage apparatus 3A and the migration destination storage apparatus 3B are equipped with the same-chassis internal copy function and the external connection function.

Moreover, the ensuing explanation is provided on the assumption that the host computer 2 is equipped with a function for sending a configuration information acquisition request for requesting, as needed, a storage apparatus to send the configuration information of that storage apparatus, and identifying the storage apparatus based on the apparatus-specific information of such storage apparatus that is notified from that storage apparatus according to such configuration information acquisition request.

These functions are defined based on the SCSI standard. Under the SCSI standard, the "configuration information acquisition request" corresponds to the Inquiry request; and the network address such as the World Wide Port Number (WWPN) of the port connected to the logical device, the apparatus number of that storage apparatus, and the vendor identifier of that storage apparatus (this is hereinafter referred to as the "vendor ID") correspond to the "apparatus-specific information" for identifying that storage apparatus. Accordingly, in the ensuing explanation, the foregoing "configuration information acquisition request" is explained as the Inquiry request, and the "apparatus-specific information" is explained as the WWPN of the port connected to the logical device, the apparatus number of that storage apparatus, and the vendor ID of that storage apparatus.

In the first storage migration method, the logical device (this is hereinafter referred to as the "migration source logical device") 50A provided by the migration source storage apparatus 3A to the host computer 2 and the virtual device 50C set in the migration source storage apparatus 3A are pair-configured as a copy pair for the same-chassis internal copy, and the logical device (this is hereinafter referred to as the "migration destination logical device") 50B set in the migration destination storage apparatus 3B is associated with the virtual device 50C. Moreover, the migration destination logical device 50B and the backup logical device (this is hereinafter referred to as the "backup logical device") 50D set in the migration destination storage apparatus 3B are pair-configured as a copy pair for the same-chassis internal copy.

Consequently, the data stored in the migration source logical device 50A is initially copied to the migration destination logical device 50B. Moreover, if data is thereafter written from the host computer 2 to the migration source logical device 50A, such data is copied to the virtual device 50C based on the same-chassis internal copy function of the migration source storage apparatus 3A, but since the virtual device 50C is an insubstantial logical device, such data is consequently copied to the migration destination logical device 50B of the migration destination storage apparatus 3B via the external connection port 30A of the migration source storage apparatus 3A based on the external connection function of the migration source storage apparatus 3A. In addition, the data stored in the migration destination logical device 50B of the migration destination storage apparatus 3B is copied to the backup logical device 50D based on the same-chassis internal copy function of the migration destination storage apparatus 3B. The data content of the migration source logical device 50A, the data content of the migration destination logical device 50B, and the data content of the backup logical device 50D are thereby synchronized.

In the foregoing case, the migration destination storage apparatus 3B of this embodiment is equipped with a virtualization function of being able to set, for each path defined between the port 30B in the migration destination storage apparatus 3B and the migration destination logical device 50B, the WWPN of the corresponding port 30A of the migration source storage apparatus 3A, and the serial number and vendor ID of the migration source storage apparatus 3A as the virtualization information 51 regarding that path, respectively, and notifying such virtualization information 51 as its own apparatus-specific information to the host computer 2 when an Inquiry request is provided from the host computer 2. Here, the "corresponding port 30A" refers to the port 30A to which the corresponding migration source logical device 50A in the migration source storage apparatus 3A.

Consequently, in the computer system 1, for example, when the connection destination of the cable 32 (FIG. 1) connecting the host computer 2 and the migration source storage apparatus 3A is reconnected from the migration source storage apparatus 3A to the migration destination storage apparatus 3B, as the reply in response to the Inquiry request that is issued from the host computer 2 to the migration destination storage apparatus 3B, the apparatus-specific information of the migration source storage apparatus 3A is sent as the apparatus-specific information of the migration destination storage apparatus 3A from the migration destination storage apparatus 3B to the host computer 2. The storage migration from the migration source storage apparatus 3A to the migration destination storage apparatus 3B can thereby be performed without causing the host computer 2 to be aware of such storage migration.

Figure 6A:
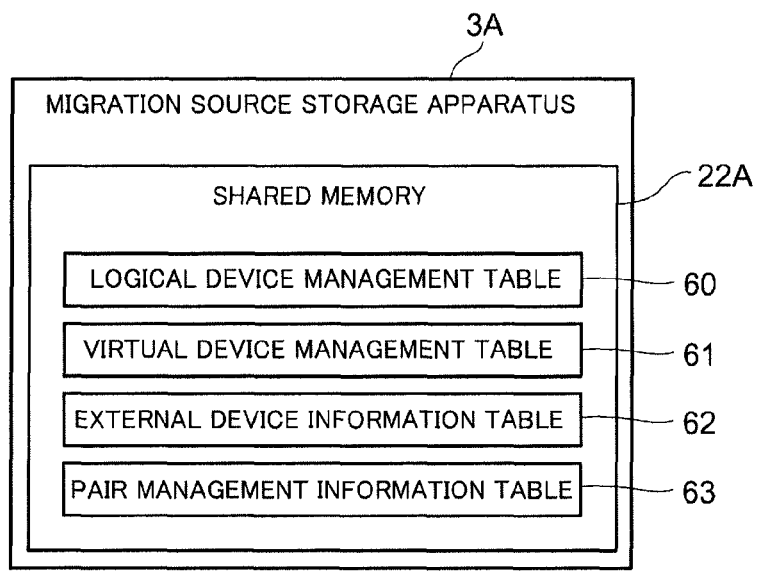
FIG. 6(A) and FIG. 6(B) are conceptual diagrams explaining the storage migration method according to the first embodiment.

As a means for executing the foregoing first storage migration processing, the shared memory 22A (FIG. 1) of the migration source storage apparatus 3A stores, as shown in FIG. 6 (A), a logical device management table 60, a virtual pool device management table 61, an external device information table 62 and a pair management information table 63, and the shared memory 22B of the migration destination storage apparatus 3B stores, as shown in FIG. 6 (B), a logical device management table 60, a virtual pool device management table 61, an external device information table 62, a pair management information table 63 and a path management table 64.

These tables are now explained in detail with reference to FIG. 7 to FIG. 11. Note that FIG. 7 to FIG. 11 illustrate, as shown in FIG. 12, the table configuration of a case where the second storage apparatus 71 with a serial number of "PPP" is externally connected to the first storage apparatus 70 via the switch 72, and the third storage apparatus 73 with a serial number of "QQQ" is externally connected to the second storage apparatus 70.

In the examples shown in FIG. 7 to FIG. 12, let it be assumed that the storage area provided by the parity group 80 with a parity group ID of "100" is managed as the virtual pool device 81A with a virtual device ID of "100" in the first storage apparatus 70, and the logical device 82A with an LDEV number of "100" and the logical device 82B with an LDEV number of "101" are defined in the virtual pool device 81A.

Moreover, let it be assumed that the virtual pool device 81B with a virtual device number of "2048" associated with the logical device 82K with a LUN of "0" (LDEV number is "10") in the second storage apparatus 71 is formed in the first storage apparatus 70, and the logical device 82C with a logical device number of "2" and the logical device 82D with a logical device number of "3" are defined in the virtual pool device 81B.

In addition, let it be assumed that the virtual pool devices 81C to 81E with virtual pool device numbers of "4096" to "4098" respective associated with mutually different logical devices 82L to 82N among the three logical devices 82L to 82N each with a LUN of "1" to "3" provided to the third storage apparatus 73 are formed in the first storage apparatus 70, the virtual devices 82E to 82G each with a logical device number of "4" to "6" are respectively created in the virtual pool devices 81C to 81E, and the virtual devices 82E to 82G are respective configured as a copy pair for the same-chassis internal copy with the logical devices 82H to 82J each with a logical device number of "10" to "12".

The logical device management table 60 is foremost explained. The logical device management table 60 is a table that is used for managing the logical devices 82A to 82J, 82K, 82L to 82N set in the self storage apparatus and is configured, as shown in FIG. 7, from a logical device number column 60A, a size column 60B and an affiliated virtual pool device number column 60C.

The logical device number column 60A stores the identification number (logical device number) assigned to the corresponding logical devices 82A to 82J, 82K, 82L to 82N which is unique to such logical devices 82A to 82J, 82K, 82L to 82N in the storage apparatus, and the size column 60B stores the size (capacity) of the corresponding logical devices 82A to 82J, 82K, 82L to 82N. Moreover, the affiliated virtual pool device number column 60C stores the identification number (virtual device number) of the virtual pool devices 81A to 81E to which the logical devices 82A to 82J, 82K, 82L to 82N are defined.

Figures 6B, 7:
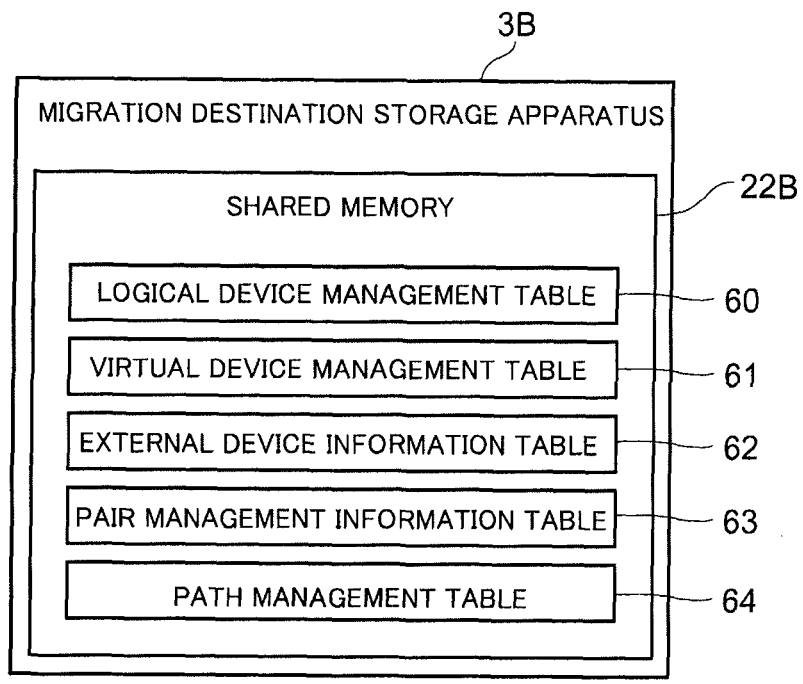
FIG. 7 is a conceptual diagram schematically showing the configuration of the logical device management table.

Accordingly, FIG. 7 shows, for example, that the size of the logical device 82A (FIG. 12) with a logical device number of "0" is "128 Mbytes" and that the logical device 82A is set in the virtual pool device 81A with a virtual pool device number of "0".

Moreover, the virtual pool device management table 61 is a table that is used for managing the virtual pool devices 81A to 81E set in the self storage apparatus and is configured, as shown in FIG. 8, from a virtual pool device number column 61A, a type column 61B, a size column 61C, a RAID level column 61D and a parity group ID column 61E.

The virtual pool device number column 61A stores the identifier (virtual pool device number) that is assigned to the corresponding virtual pool devices 81A to 81E, and the type column 61B stores the type (internal volume or external volume) of the virtual pool devices 81A to 81E. Moreover, the size column 61C stores the size (capacity) of the corresponding virtual pool devices 81A to 81E, and the RAID level column 61D stores the RAID level that is set to the parity group 80 (FIG. 12) to which the virtual pool devices 81A to 81E are set. In addition, the parity group ID column 61E stores the identifier (parity group ID) that is assigned to the parity group 80.

Accordingly, FIG. 8 shows that the virtual pool device 81A (FIG. 12) with a virtual pool device number of "0" has a capacity of "384 Mbytes" and is an "internal volume (internal VOL)" configured from the storage area provided by the parity group 80 with a RAID level of "RAID 5" and a parity group ID of "0".

The external device information table 62 is a table that is used for managing the virtual pool devices 81A to 81E associated with the external device that is set in the external storage apparatus (the migration destination storage apparatus 3B from the perspective of the migration source storage apparatus 3A and the migration source storage apparatus 3A from the perspective of the migration destination storage apparatus 3B) in relation to the external connection function and is configured, as shown in FIG. 9, a virtual pool device number column 62A, an external-side apparatus serial number column 62B, a path number column 62C, an external-side WWPN column 62D, an external-side LUN column 62E, a self storage-side port number column 62F and a path status column 62G.

The virtual pool device number column 62A stores the virtual pool device number that is assigned to the corresponding virtual pool devices 81A to 81E. Moreover, the path number column 62C stores the identifier (path number) of the path from the virtual pool devices 81A to 81E to the logical device in the external storage apparatus associated with the virtual pool devices 81A to 81E, and the path status column 62G stores the current status of that path.

In addition, the external-side apparatus serial number column 62B stores the serial number of the external storage apparatus to which the external device associated with the virtual pool devices 81A to 81E is set, and the external-side WWPN column 62E stores the WWPM of the port on the external storage apparatus side for accessing the external device. Furthermore, the external-side LUN column 62E stores the LUN of the external device, and the self storage-side port number column 62F stores the port number of the external connection port on the self storage apparatus side that is connected to the external device.

Accordingly, FIG. 9 shows, for example, that the virtual pool device 81B (FIG. 12) with a virtual pool device number of "2048" is connected to the logical device 82K (FIG. 12) with a logical device number of "0" in the external storage apparatus with a serial number of "AAA", the virtual pool device 81B and the logical device 82K are connected to the port in which the WWPN of the external storage apparatus is "A0" via the path with a path number of "0" connecting the ports of port number "0" of the self storage apparatus, and the path status of the path is currently "normal".

Meanwhile, the pair management information table 63 is a table that is used for managing the copy pair of the same-chassis internal copy set in the self storage apparatus and is configured, as shown in FIG. 10, from a management number column 63A, a primary logical device number column 63B, a secondary logical device number column 63C and a pair status column 63D.

The management number column 63A stores the identifier (pair number) that is assigned to the corresponding copy pair. Moreover, the primary logical device number column 63B stores the logical device number of the logical devices 82E to 82G set on the primary side in the copy pair, and the secondary logical device number column 63C stores the logical device number of the logical devices 82H to 82J set on the secondary side in the copy pair. In addition, the pair status column 63D stores the current pair status of the copy pair.

Accordingly, FIG. 10 shows, for example, with the copy pair of pair number "0", that the logical device 82E (FIG. 12) with a logical device number of "4" is set on the primary side and the logical device 82H (FIG. 12) with a logical device number of "10" is set on the secondary side, respectively, and that the current pair status is "pairing". FIG. 10 also shows, for example, with the copy pair of pair number "2", that the logical device 82G (FIG. 12) with a logical device number of "6" is set on the primary side and the logical device 82J (FIG. 12) with a logical device number of "12" is set on the secondary side, respectively, and that the current pair status is "splitting". Note that the status of "splitting" refers to the status in which copy is being performed (status of "copy") in order to synchronize the contents of the logical devices between the primary side and the secondary side prior to the corresponding copy pair becoming the pair status of "split".

Meanwhile, the path management table 64 is a table that is used for managing the foregoing virtualization information 51 (FIG. 5) that is set in path units connecting the ports in the self storage apparatus and the logical devices and is configured, as shown in FIG. 11, a WWPN column 64A, a host WWPN column 64B, a LUN column 64C, a virtualization flag column 64D, a virtual WWPN column 64E, a virtual serial number column 64F and a virtual vendor ID column 64G.

The WWPN column 64A stores the WWPN of the port in the self storage apparatus to which the corresponding path is connected, and the host WWPN column 64B stores the WWPN of the port of the host computer to which the foregoing port is connected.

Moreover, the LUN column 64C stores the LUN of the logical device in the self storage apparatus connected to the foregoing port in the self storage apparatus, and the virtualization flag column 64D stores the virtualization flag representing whether the virtualization information 51 set for the corresponding path is valid. The virtualization flag is set to "ON" if the virtualization information 51 is valid and set to "OFF" if the virtualization information 51 is invalid.

In addition, the virtual WWPN column 64E stores the WWPN of the virtual port that is set to the corresponding path, and the virtual serial number column 64F stores the serial number of the external storage apparatus to which is set the logical device assigned with the LUN stored in the LUN column 64C. Furthermore, the virtual vendor ID column 64G stores the vendor ID of the vendor of the external storage apparatus.

Accordingly, FIG. 11 shows, for example, that the port of "S100" is connected to the port of "H0" of the host computer, and the port of "S100" is connected the three logical devices in which the LUN is "0", "1" and "2", respectively. FIG. 11 also shows that the virtual WWPN of "S0" as the port number of the port connected to with the host computer in the corresponding external storage apparatus, the virtual serial number of "PPP" as the serial number of the external storage apparatus, and the virtual vendor ID of "VendA" as the vendor ID of the vendor of the external storage apparatus are set as the virtualization information 51 to the respective paths connecting each of the three logical devices and the port of "S100", and the virtualization information set to each of the three paths is all "valid (ON)".

(1-3) Storage Migration Sequence in Present Embodiment

Figure 13:
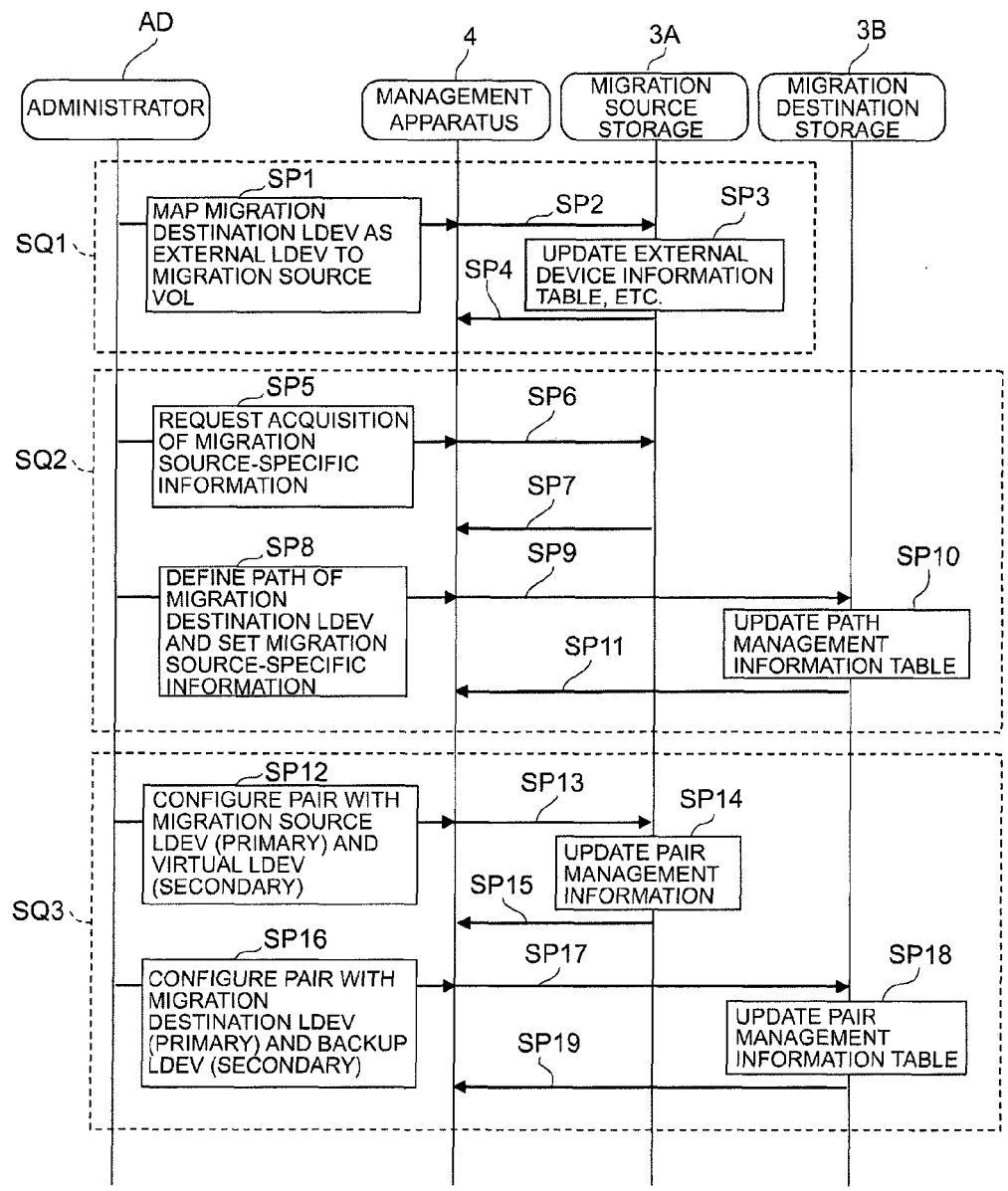
FIG. 13 is a sequence diagram showing the processing flow in the first storage migration method.
Figure 14:
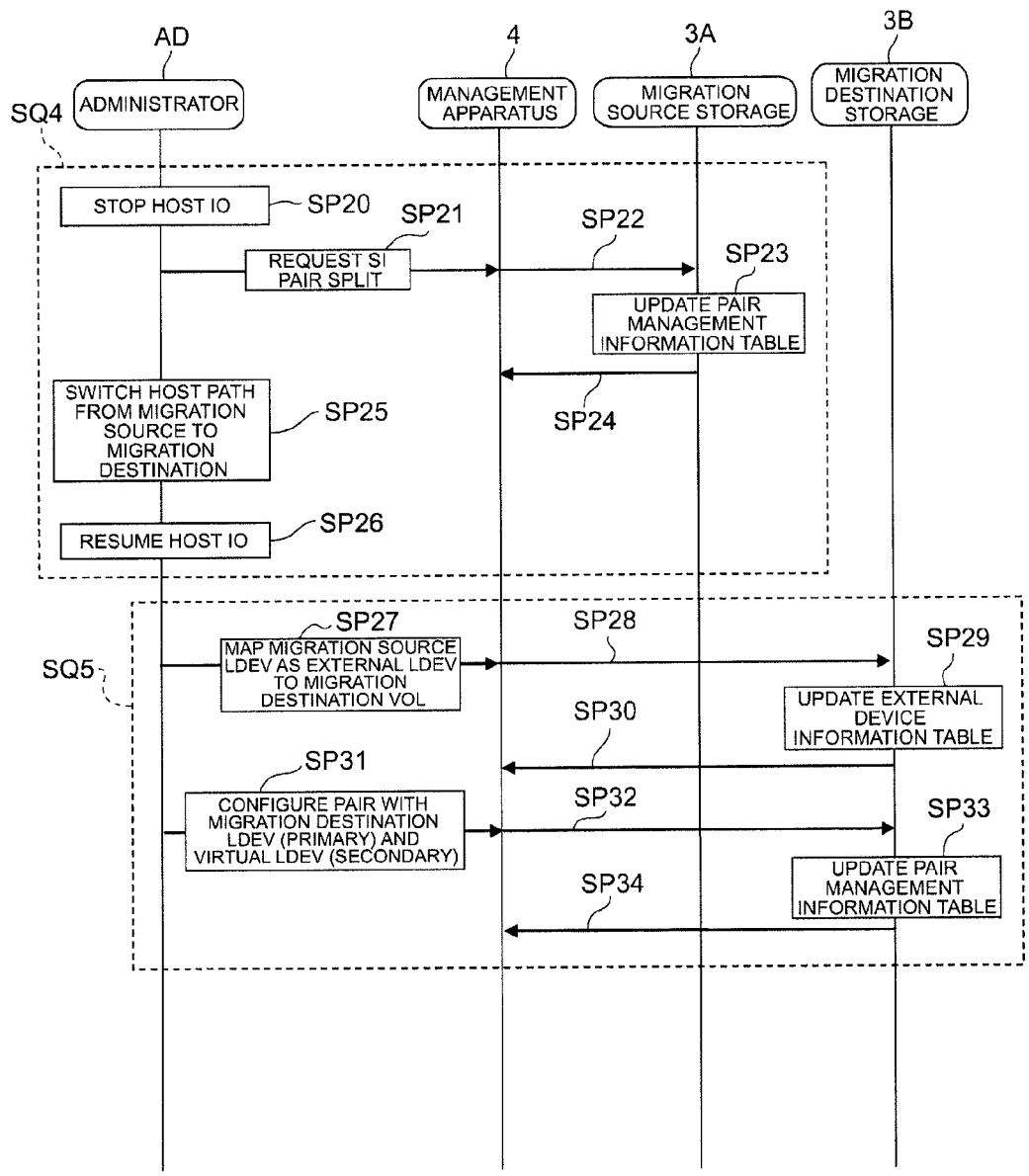
FIG. 14 is a sequence diagram showing the processing flow in the first storage migration method.

The flow of the processing (this is hereinafter referred to as the "storage migration processing") upon migrating (exchanging) the migration source storage apparatus 3A to the migration destination storage apparatus 3B according to the first storage migration method is now explained with reference to FIG. 13 and FIG. 14. The storage migration processing is configured from five sequences; namely, a first mapping sequence SQ1, a virtualization information setting sequence SQ2, a copy pair configuration sequence SQ3, a storage switching sequence SQ4 and a second mapping sequence SQ5.

Foremost, the administrator AD operates the management apparatus 4 to map the corresponding migration destination logical device 50B (FIG. 5) provided in the migration destination storage apparatus 3B to each of the migration source logical devices 50A (FIG. 5) in the migration source storage apparatus 3A (SP1). Specifically, the administrator AD creates a virtual pool device by associating it with the respective migration destination logical devices 50B in the migration source storage apparatus 3A, and defines the virtual device 50C (FIG. 5) by associating it with the respective migration destination logical devices 50B in the virtual pool device.

Consequently, a mapping command corresponding to the foregoing operation of the administrator AD is sent from the management apparatus 4 to the migration source storage apparatus 3A (SP2).

When the control processor 21A of the migration source storage apparatus 3A receives the foregoing mapping command, it updates the logical device management table 60 (FIG. 7), the virtual pool device management table 61 (FIG. 8) and the external device information table 62 (FIG. 9), respectively, based on the mapping command (SP3).

Specifically, the control processor 21A forms a virtual pool device by associating it with each of the migration source logical devices 50A, and stores the virtual pool device number, type and size (capacity) of each of the formed virtual pool devices in the virtual pool device number column 61A, the type column 61B and the size column 61C, respectively, of the newly allocated entry in the virtual pool device management table 61. Moreover, the control processor 21A stores the RAID level of the corresponding migration source logical device 50A and the parity group ID of the parity group 80 (FIG. 12) forming the migration source logical device 50A in the RAID level column 61D and the parity group ID column 61E, respectively, of the foregoing entry.

Moreover, the control processor 21A stores the logical device number of each of the virtual devices 50C defined in the foregoing virtual pool device by being associated with each of the migration source logical devices 50A and the size of such virtual devices 50C in the logical device number column 60A and the size column 60B, respectively, of the newly allocated entry in the logical device management table 60, and additionally stores the virtual pool device number of the virtual pool device to which the virtual device 50C is affiliated in the affiliated virtual pool device number column 60C of the foregoing entry.

In addition, the control processor 21A stores the virtual pool device number of each of the virtual pool devices formed by being associated with each of the migration source logical devices 50A in the virtual pool device number column 62A of the newly allocated entry in the external device information table 62, respectively, and additionally stores the port number of the port (port connected to the corresponding migration destination logical device 50B in the migration destination storage apparatus 3B) 30A associated with the corresponding virtual pool device in the self storage-side port number column 62F of each entry, respectively.

Moreover, the control processor 21A stores the path number of the path connecting the corresponding virtual pool device and the migration destination logical device 50B thereof in the path number column 62C of each entry, and additionally stores the current status of the corresponding path in the path status column 62G of the foregoing entries. In addition, the control processor 21A stores the serial number of the migration destination storage apparatus 3A in the external-side apparatus serial number column 62B of each entry, stores the WWPN of the port 30B on the migration destination storage apparatus 3B side connected to the corresponding virtual pool device in the external-side WWPN column 62D of the foregoing entries, and additionally stores the LUN of the corresponding migration destination logical device 50B in the external-side LUN column 62E of the foregoing entries.

When the control processor 21A completes updating the logical device management table 60, the virtual pool device management table 61 and the external device information table 62, it notifies the update completion to the management apparatus 4 (SP4).

Figure 15:
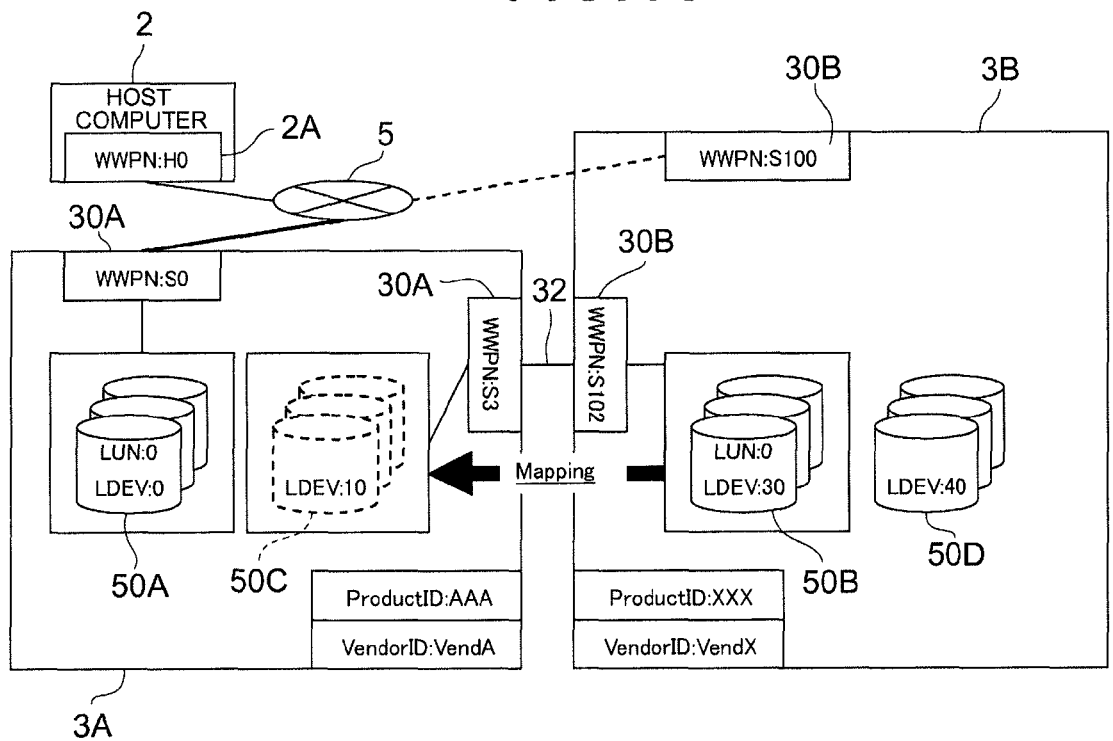
FIG. 15 is a conceptual diagram explaining the processing flow in the first storage migration method.

Based on the foregoing processing from step SP1 to step SP4, as shown in FIG. 15, the corresponding migration destination logical device 50B provided in the migration destination storage apparatus 3B is mapped as an external logical device to each of the migration source logical devices 50A in the migration source storage apparatus 3A, respectively.

Subsequently, the administrator AD issues a command to the management apparatus 4 for acquiring the WWPN of each corresponding port 30A in the migration source storage apparatus 3A and the vendor ID and the serial number of the migration source storage apparatus 3A (SP5). Here, "each corresponding port" refers to each port 30A of the migration source storage apparatus 3A which is connected to the migration source logical device 50A that was mapped with the migration destination logical device 50B at step SP1 to step SP3. Consequently, an apparatus-specific information notification request for requesting the notification of such WWPN, vendor ID and serial number is sent from the management apparatus 4 to the migration source storage apparatus 3A (SP6).

When the control processor 21A of the migration source storage apparatus 3A receives the foregoing apparatus-specific information notification request, it sends the WWPN of each corresponding port 30A in the self storage apparatus and the vendor ID and serial number of the self storage apparatus to the management apparatus 4 (SP7). Consequently, the WWPN of each corresponding port 30A in the migration source storage apparatus 3A and the vendor ID and serial number of the migration source storage apparatus 3A that were acquired by the management apparatus 4 are displayed on the management apparatus 4.

The administrator AD thereafter defines the respective paths to the migration destination logical device 50B mapped to the migration source logical device 50A at step SP3 on the screen of the management apparatus 4 based on the WWPN of each corresponding port 30A in the migration source storage apparatus 3A and the vendor ID and serial number of the migration source storage apparatus 3A displayed on the management apparatus 4 as described above (SP8).

Moreover, the administrator AD sets each WWPN of each port 30A of the migration source storage apparatus 3A displayed on the management apparatus 4 as the virtual WWPN (this is hereinafter referred to as the "virtual WWPN") of the corresponding port 30B of the migration destination storage apparatus 3B (that is, the port 30B of the migration destination storage apparatus 3B connected to the migration destination logical device 50B that was mapped as the external logical device to the migration source logical device 50A connected to the port 30A of the migration source storage apparatus 3A), respectively, and sets the vendor ID and serial number of the migration source storage apparatus 3A displayed on the management apparatus 4 as the virtual vendor ID (this is hereinafter referred to as the "virtual vendor ID") and the virtual serial number (this is hereinafter referred to as the "virtual serial number") of the migration destination storage apparatus 3B (SP8). Consequently, a virtualization information setting command corresponding to the foregoing operations of the administrator AD is sent from the management apparatus 4 to the migration destination storage apparatus 3B (SP9).

When the control processor 21B of the migration destination storage apparatus 3B receives the foregoing virtualization information setting command, it updates the path management table 64 (FIG. 11) based on the virtualization information setting command (SP10). Specifically, the control processor 12B stores the corresponding virtual WWPN that was designated in the virtualization information setting request in the virtual WWPN column 64E of each entry corresponding to each port 30B, among the entries of the path management table 64, to which the virtual WWPN was notified in the virtualization information setting request, and stores the virtual serial number and the virtual vendor ID designated in the virtualization information setting request in the virtual serial number column 64F and the virtual vendor ID column 64G of the foregoing entries, respectively. Moreover, the control processor 21B sets the virtualization flag stored in the virtualization flag column 64D of the foregoing entries to "ON".

When the control processor 21B completes updating the path management table 64, it notifies the update completion to the management apparatus 4 (SP11).

Figure 16:
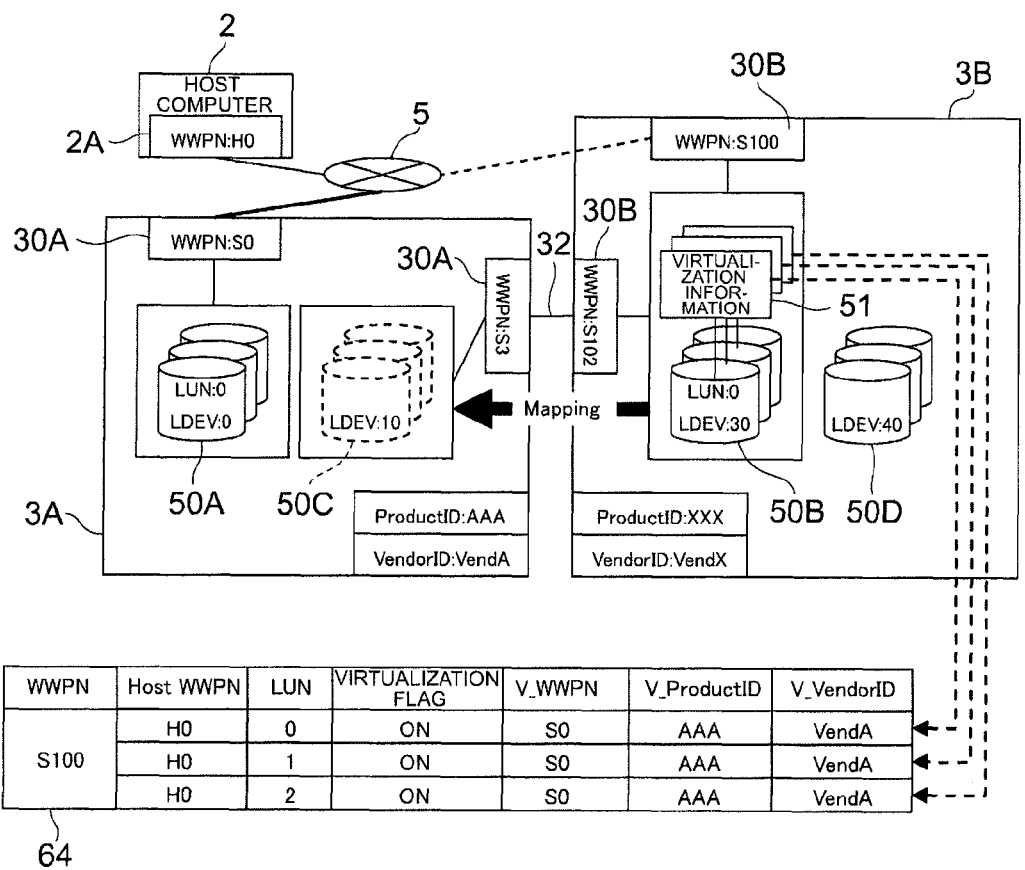
FIG. 16 is a conceptual diagram explaining the processing flow in the first storage migration method.

Based on the foregoing processing from step SP5 to step SP11, as shown in FIG. 16, the WWPN of the corresponding port 30A of the migration source storage apparatus 3A is set as the virtual WWPN of the port 30B for each path connecting the migration destination logical device 50B in the migration destination storage apparatus 3B and the corresponding port 30B, and the vendor ID and serial number of the migration source storage apparatus 3A are respectively set as the virtual vendor ID and virtual serial number of the migration destination storage apparatus 3B.

Subsequently, the administrator AD operates the management apparatus 4 to form a copy pair with the migration source logical device 50A as the primary device and the virtual device 50C to which the migration source logical device 50A was associated as the secondary device (SP12). Consequently, a copy pair configuration command for setting the copy pair formed above is provided from the management apparatus 4 to the migration source storage apparatus 3A (SP13).

When the control processor 21A of the migration source storage apparatus 3A receives the foregoing copy pair configuration command, it updates the pair management information table 63 (FIG. 10) according to the copy pair configuration command (SP14).

Specifically, the control processor 21A allocates an unused entry in the pair management information table 63 and stores the pair number assigned to such copy pair in the management number column 63A of the foregoing entry. Moreover, the control processor 21A stores the logical device number of the migration source logical device 50A designated as the primary device in the copy pair configuration command in the primary logical device number column 63B of the foregoing entry, and stores the logical device number of the virtual device 50C designated as the secondary device in the copy pair configuration command in the secondary logical device number column 63C of the foregoing entry. In addition, the control processor 21A stores the pair status of the foregoing copy pair in the pair status column 63D of the foregoing entry.

When the control processor 21A completes updating the pair management information table 63, it notifies the update completion to the management apparatus 4 (SP15).

Subsequently, the administrator AD operates the management apparatus 4 configures a copy pair with the migration destination logical device 50B in the migration destination storage apparatus 3B as the primary device, and the backup logical device 50D provided by being associated with the migration destination logical device 50B as the secondary device (SP16). Consequently, a copy pair configuration command according to the foregoing operations of the administrator AD is sent from the management apparatus 4 to the migration destination storage apparatus 3B (SP17).

When the control processor 21B of the migration destination storage apparatus 3B receives the foregoing copy pair configuration command, it updates the pair management information table 63 (FIG. 10) based on the copy pair configuration command (SP18).

Specifically, the control processor 21B allocates an unused entry in the pair management information table 63, and stores the pair number assigned to the foregoing copy pair in the management number column 63A of the foregoing entry. Moreover, the control processor 21B stores the logical device number of the logical device (migration destination logical device 50B) designated as the primary device in the copy pair configuration command in the primary logical device number column 63B of the foregoing entry, and stores the logical device number of the logical device (backup logical device 50D) designated as the secondary device in the copy pair configuration command in the secondary logical device number column 63C of the foregoing entry. In addition, the control processor 21B stores the pair status of the foregoing copy pair in the pair status column 63D of the foregoing entry.

When the control processor 21B completes updating the pair management information table 63, it notifies the update completion to the management apparatus 4 (SP19).

Figure 17:
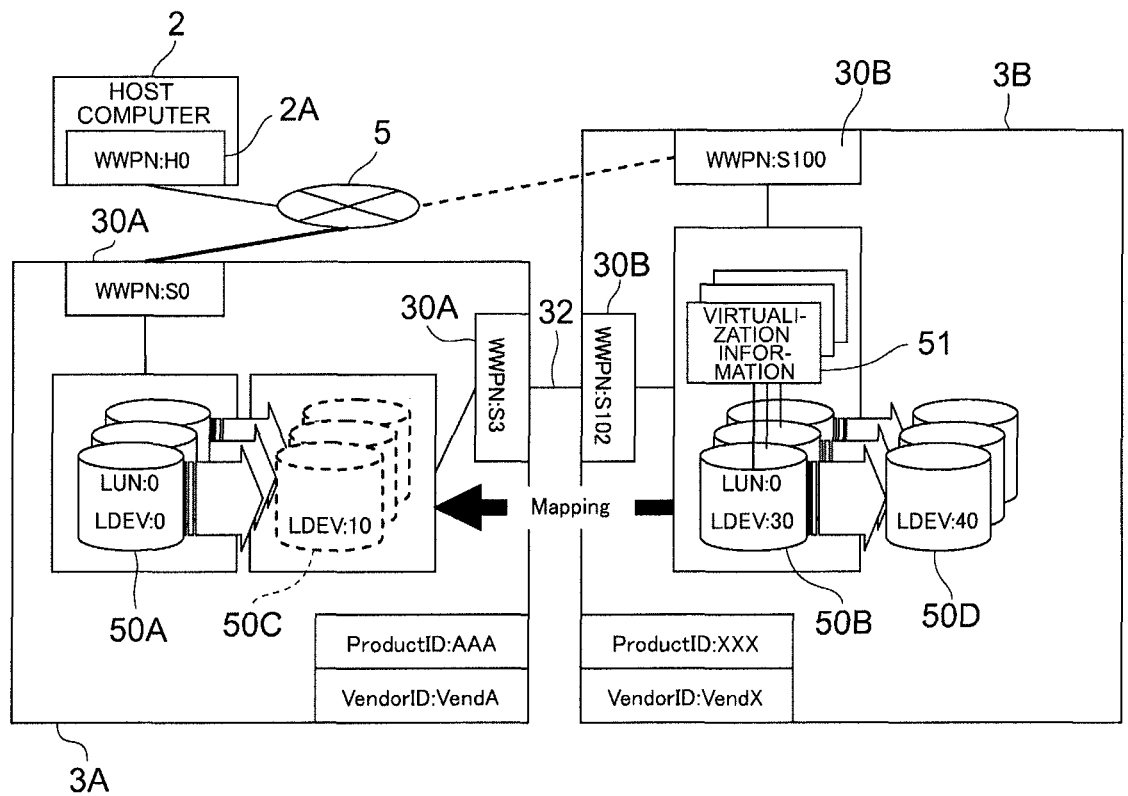
FIG. 17 is a conceptual diagram explaining the processing flow in the first storage migration method.

Based on the foregoing processing from step SP12 to step SP19, as shown in FIG. 17, the copy pair with the migration source logical device 50A as the primary device and the virtual device 50C to which the migration source logical device 50A is associated as the secondary device is set in the migration source storage apparatus 3A, and the copy pair with the migration destination logical device 50B as the primary device and the backup logical device 50D as the secondary device is set in the migration destination storage apparatus 3B.

Moreover, the data copy between the migration source logical device 50A and the migration destination logical device 50B and the data copy between the migration destination logical device 50B and the backup logical device 50D are thereafter performed so that the data content of the migration source logical device 50A and the data content of the migration destination logical device 50B and the data content of the backup logical device 50D are synchronized (will coincide).

Subsequently, the administrator AD operates (for example, shuts down) the host computer 2 so that the host computer 2 will not issue a data I/O request (I/O) to the migration source storage apparatus 3A (SP20), and additionally operates the management apparatus 4 so as to change the pair status of the copy pair in the migration source storage apparatus 3A set at step SP1 to the status of "split" for stopping the data copy from the primary device to the secondary device (SP21). Consequently, a pair status change command according to the foregoing operations of the administrator AD is sent from the management apparatus 4 to the migration source storage apparatus 3A (SP22).

When the control processor 21A of the migration source storage apparatus 3A receives the foregoing pair status change command, it executes the data copy from the migration source logical device 50A to the migration destination logical device 50B until the migration source logical device 50A and the migration destination logical device 50B become a synchronized status based on the foregoing pair status change command, and thereafter updates the pair status stored in the pair status column 63D of the corresponding entry in the pair management information table 63 to "split" (SP23).

Consequently, even if the host computer 2 attempts to write data into the corresponding migration source logical device 50A, the data copy from the migration source logical device 50A to the virtual device 50C associated with the migration source logical device 50A (more precisely, the data copy from the migration source logical device 50A to the corresponding migration destination logical device 50B) in the migration source storage apparatus 3A is not performed. When the control processor 21A completes updating the pair management information table 63, it notifies the update completion to the management apparatus 4 (SP24).

Subsequently, the administrator AD switches the connection destination of the host computer 2 from the migration source storage apparatus 3A to the migration destination storage apparatus 3B, for example, by switching the connection destination of the cable connecting the host computer 2 and the migration destination storage apparatus 3A (SP25). Moreover, the administrator AD operates (for example, restarts) the host computer 2 so as to resume issuing the data I/O request from the host computer 2 to the migration source storage apparatus 3A (in reality to the migration destination storage apparatus 3B) (SP26).

Consequently, the host computer 2 executes, after it is restarted, the Inquiry reply processing described later with reference to FIG. 20 with the migration destination storage apparatus 3B.

Figure 18:
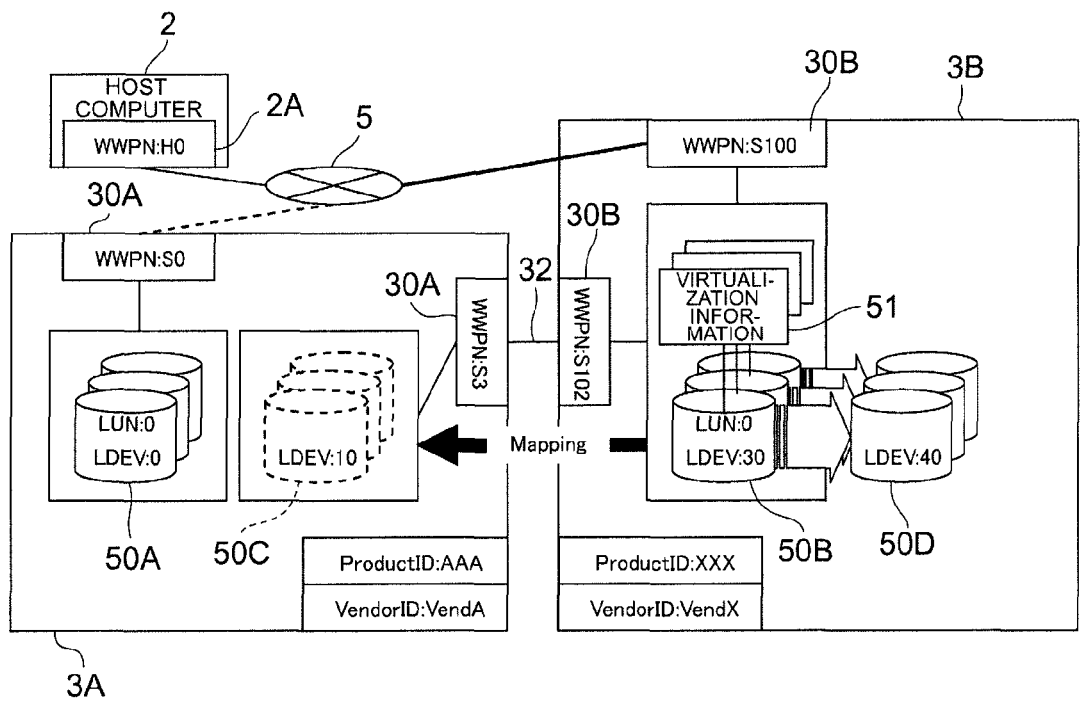
FIG. 18 is a conceptual diagram explaining the processing flow in the first storage migration method.

Based on the foregoing processing from step SP20 to step SP26, as shown in FIG. 18, the data stored in each of the migration source logical devices 50A and the data stored in the migration destination logical devices 50B mapped to the migration source logical devices 50A are synchronized, and the host path (path connecting the host computer 2 and the storage apparatus) is switched to the migration destination storage apparatus 3B in the foregoing status. Moreover, the data I/O request that is thereafter issued from the host computer 2 to the migration source storage apparatus 3A is sent to the migration destination storage apparatus 3B.

Figure 19:
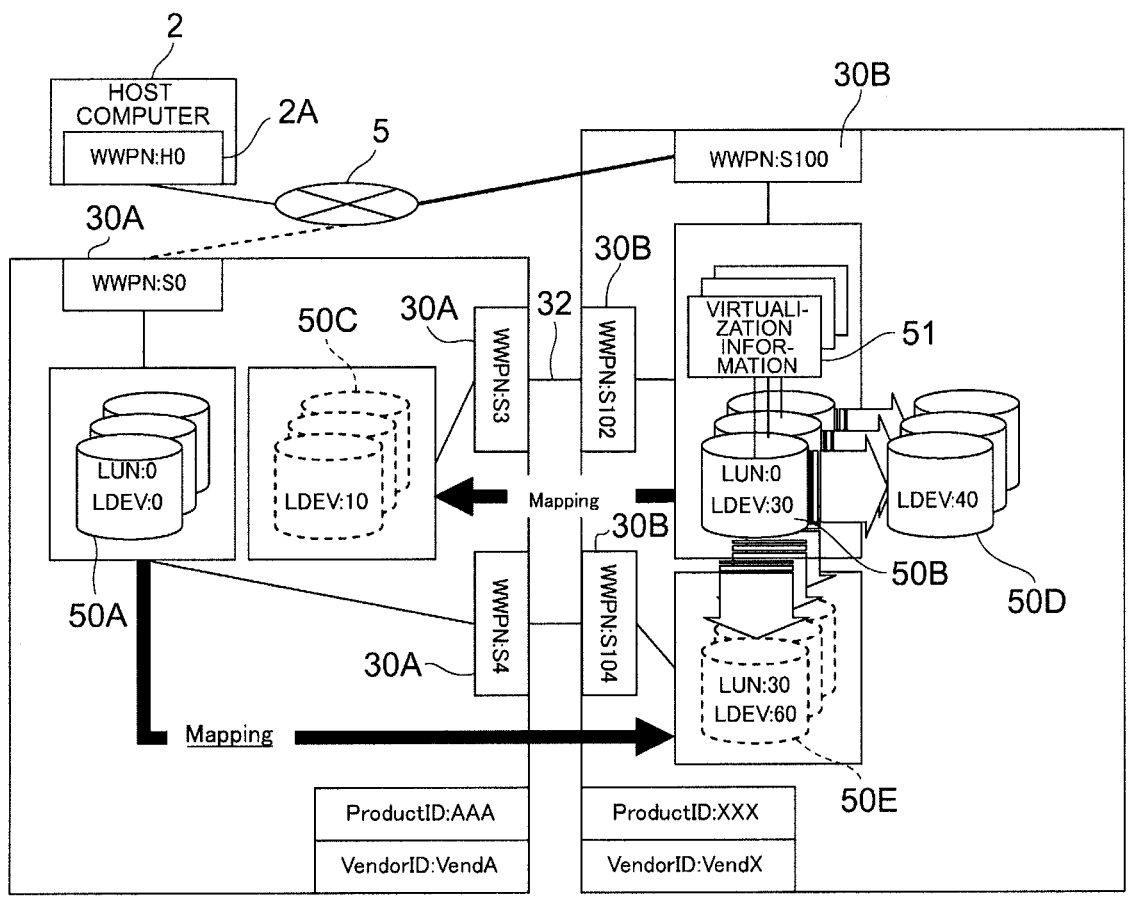
FIG. 19 is a conceptual diagram explaining the processing flow in the first storage migration method.

The administrator AD thereafter operates the management apparatus 4, as shown in FIG. 19, to form a virtual pool device (not shown) by associating it with each of the migration source logical devices 50A, and forms the virtual device 50E in the virtual pool device. Moreover, the administrator AD maps the corresponding migration source logical device 50A as an external device to the virtual device 50E (SP27). Consequently, a mapping operation according to the foregoing operations of the administrator AD is sent from the management apparatus 4 to the migration destination storage apparatus 3B (SP28).

When the control processor 21B of the migration destination storage apparatus 3B receives the foregoing mapping command, it updates the external device information table 62 (FIG. 9) based on the mapping command (SP29).

Specifically, the control processor 21B forms the virtual pool device and the virtual device 50E by respectively associating them with each of the migration destination logical device 50B according to the foregoing command, and stores the virtual pool device number assigned to the formed virtual pool device in the virtual pool device number column 62A, respectively.

Moreover, the control processor 21B stores the port number of the port 30B (FIG. 19) in the self storage apparatus connected to the virtual device 50E defined in each of the virtual pool devices in the self storage-side port number column 62F. Furthermore, the control processor 21B stores the path number assigned to the path connecting the foregoing port 30B and the corresponding migration destination logical device 50B in the path number column 62C, and stores the current status of the foregoing path in the path status column 62G.

In addition, the control processor 21B stores the serial number of the migration source storage apparatus 3A in the external-side apparatus serial number column 62D, stores the WWPN of the port 30A of the migration source storage apparatus 3A to be connected to the corresponding virtual device in the external-side WWPN column 62D, and additionally stores the LUN of the migration source logical device 50A in the external-side LUN column 62E. The control processor 21B thereafter sends a reply in response to the foregoing mapping command to the management apparatus 4 (SP30).

Subsequently, the administrator AD operates the management apparatus 4 to configure a copy pair with each of the migration destination logical devices 50B as the primary device and the corresponding virtual devices 50E formed in the migration destination storage apparatus 3B at step SP27 to step SP29 as the secondary device (SP31). Consequently, a copy pair configuration command according to the foregoing operations of the administrator AD is sent from the management apparatus 4 to the migration destination storage apparatus 3B (SP32).

When the control processor 21B of the migration destination storage apparatus 3B receives the foregoing copy pair configuration command, it updates the pair management information table 63 (FIG. 10) based on the copy pair configuration command (SP33).

Specifically, the control processor 21B allocates an unused entry in the pair management information table 63 and stores the pair number assigned to the foregoing copy pair in the management number column 63A of the foregoing entry. Moreover, the control processor 21B stores the logical device number of the logical device (migration destination logical device 50B) designated as the primary device in the copy pair configuration command in the primary logical device number column 63B of the foregoing entry, and stores the logical device number assigned to the logical device (corresponding virtual device 50E) designated as the secondary device in the copy pair configuration command in the secondary logical device number column 63C of the foregoing entry. In addition, the control processor 21B stores the pair status of the foregoing copy pair in the pair status column 63D of the foregoing entry.

When the migration destination storage apparatus completes updating the pair management information table 63, it notifies the update completion to the management apparatus 4 (SP34).

Based on the foregoing processing from step SP27 to step SP34, as shown in FIG. 19, the virtual devices 50E mapped with the corresponding migration source logical device 50A by being associated with each of the migration destination logical devices 50B are formed in the migration destination storage apparatus 3B, and the copy pair with each of the migration destination logical devices 50B as the primary device and the corresponding virtual device 50E as the secondary device is configured in the migration destination storage apparatus 3B.

Consequently, when data is written from the host computer 2 into the migration destination logical device 50B, although such data is copied to the virtual device 50E based on the same-chassis internal copy function of the migration destination storage apparatus 3B, since the virtual device 50E is an insubstantial logical device, such data is consequently is copied to the migration source logical device 50A of the migration source storage apparatus 3A via the external connection port 30B of the migration destination storage apparatus 3B based on the external connection function of the migration destination storage apparatus 3B. The status where the data content of the migration source logical device 50A and the data content of the migration destination logical device 50B are synchronized is thereby maintained.

Accordingly, when it is necessary to return the host path to the migration source storage apparatus 3A due to the malfunction of the migration destination storage apparatus 3B or the failure of the host path to the migration destination storage apparatus 3B, the host path can be returned to the migration source storage apparatus 3A side based on the same processing as step SP20 to step SP26.

Note that the migration from the migration source storage apparatus 3A to the migration destination storage apparatus 3B is thereafter completed as a result of separating the migration source storage apparatus 3A from the host computer 2.

(1-4) Inquiry Reply Sequence

Figure 20:
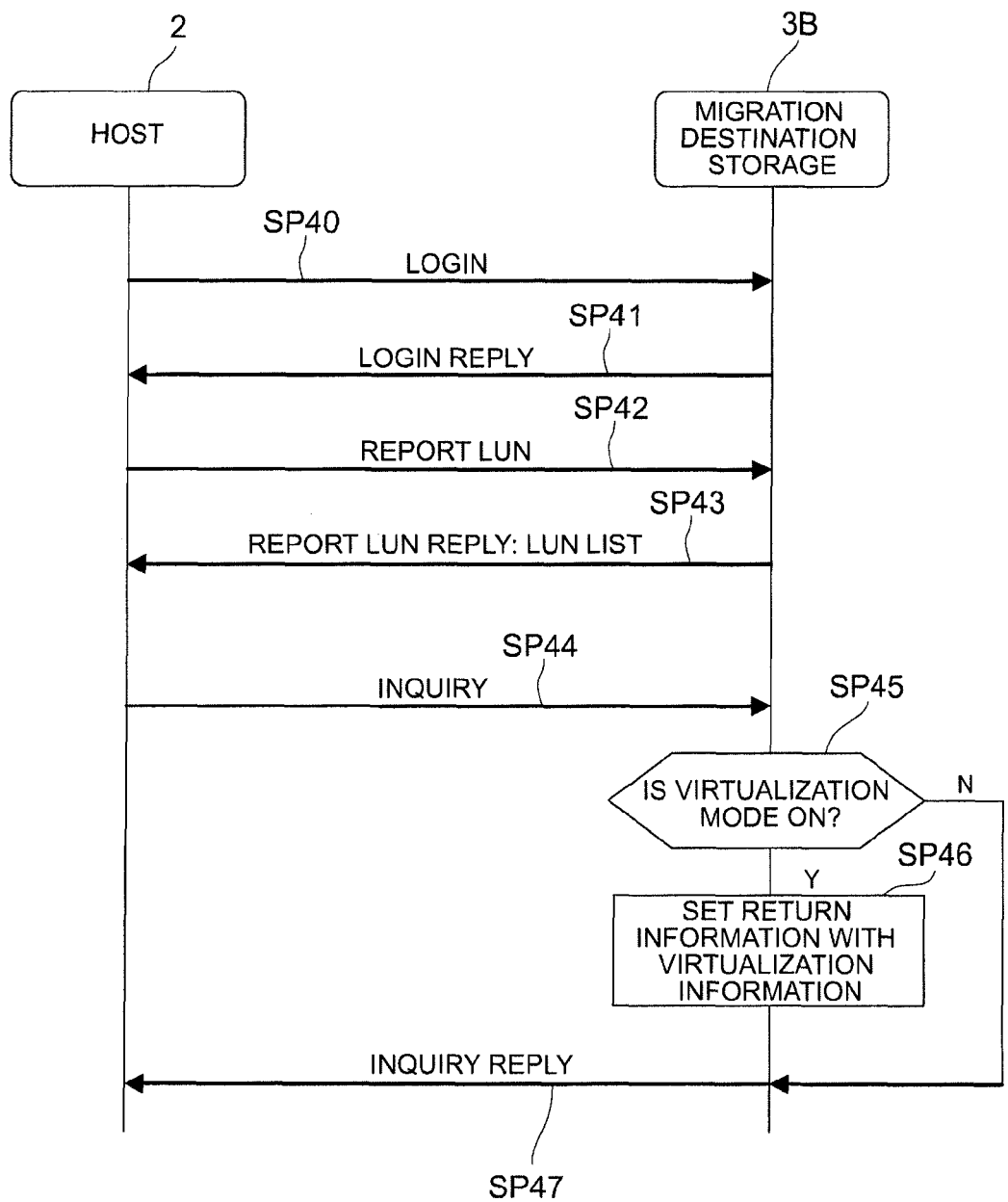
FIG. 20 is a sequence diagram showing the flow of the Inquiry reply sequence.

FIG. 20 shows the Inquiry reply sequence that is executed by the host computer 2 in which the connection destination was switched from the migration source storage apparatus 3A to the migration destination storage apparatus 3B at step SP25 of the storage migration sequence described above with reference to FIG. 13 to FIG. 19, and the control processor 21B of the migration destination storage apparatus 3B.

The host computer 2 in which the connection destination was switched from the migration source storage apparatus 3A to the migration destination storage apparatus 3B at step SP25 foremost issues a login request to the migration destination storage apparatus 3B (SP40). The migration destination storage apparatus 3B that received the foregoing login request determines whether the user attempting to log in using the host computer 2 is authorized to log into the self storage apparatus, and, upon determining that the user has such authority, sends a login reply permitting the login to the host computer 2 (SP41).

The host computer 2 that received the foregoing login reply sends to the migration destination storage apparatus 3A report LUN request for requesting the migration destination storage apparatus 3B to transfer the list of LUNs (this is hereinafter referred to as the "LUN list") of the respective logical devices existing in the migration destination storage apparatus 3B (SP42). Consequently, the control processor 21B of the migration destination storage apparatus 3B that received the foregoing report LUN request creates a LUN list (not shown) listing the LUNs of all logical devices existing in the self storage apparatus and sends this to the host computer 2 (SP43).

The host computer 2 that received the foregoing LUN list sends, in order, the Inquiry commands targeting each of the logical devices in which its LUN is registered in the LUN list to the migration destination storage apparatus 3B (SP44).

Moreover, the control processor 21B of the migration destination storage apparatus 3B that received the foregoing Inquiry command refers to the virtualization flag column 64D (FIG. 11) of the corresponding entry of the path management table 64 (FIG. 11), and determines whether the virtualization flag of the logical devices subject to the Inquiry command is "ON" (SP45).

If the foregoing virtualization flag is "OFF", the control processor 21B of the migration destination storage apparatus 3B sends an Inquiry reply containing the WWPN of the actual port 30B connected to that logical device and the serial number and vendor ID of the migration destination storage apparatus 3B to the host computer 2 (SP46).

Meanwhile, if the foregoing virtualization flag is "ON", the migration destination storage apparatus 3B sends an Inquiry reply containing the virtual WWPN, virtual serial number and virtual vendor ID set for that logical device to the host computer.

In the foregoing case, the virtualization flag is set to "ON" for the migration destination logical device 50B mapped to the migration source logical device 50A. Consequently, the host computer 2 will recognize, based on the foregoing Inquiry reply, the migration destination logical device 50B mapped to the migration source logical device 50A as the corresponding migration source logical device 50A of the migration source storage apparatus 3A.

(1-5) Effect of Present Embodiment

As described above, since the computer system 1 according to this embodiment is able to set, as the virtualization information 51, various types of unique information (WWPN, serial number and vendor ID) corresponding to the migration source storage apparatus 3A in path units connecting the port 30A in the migration destination storage apparatus 3A and the migration destination logical device 50B, and since the migration destination storage apparatus 3B returns the foregoing virtualization information 51 as an Inquiry reply in response to the Inquiry request from the host computer 2, storage migration from the migration source storage apparatus 3A to the migration destination storage apparatus 3B can be performed without causing the host computer 2 to be aware of such storage migration.

In the foregoing case, with this embodiment, there is no need to load alternate path software in the host computer 2 or provide a virtualization control device between the host computer 2 and the migration source storage apparatus 3A/migration destination storage apparatus 3B or apply NPIV to the migration source storage apparatus 3A upon performing storage migration from the migration source storage apparatus 3A to the migration destination storage apparatus 3B.

Thus, according to the first data migration method, a storage apparatus can be migrated based on the same operation regardless of the type of OS of the host computer 2, and without affecting the I/O performance during normal times. It is thereby possible to simplify the migration process of a storage apparatus while avoiding the performance degradation of the overall system.

Moreover, according to the first data migration method, even in cases where the emulation type of the migration source logical device 50A and the migration destination logical device 50B is different, data of the migration source logical device 50A can be migrated to the migration destination logical device 50B.

(2) Second Embodiment

Figure 21:
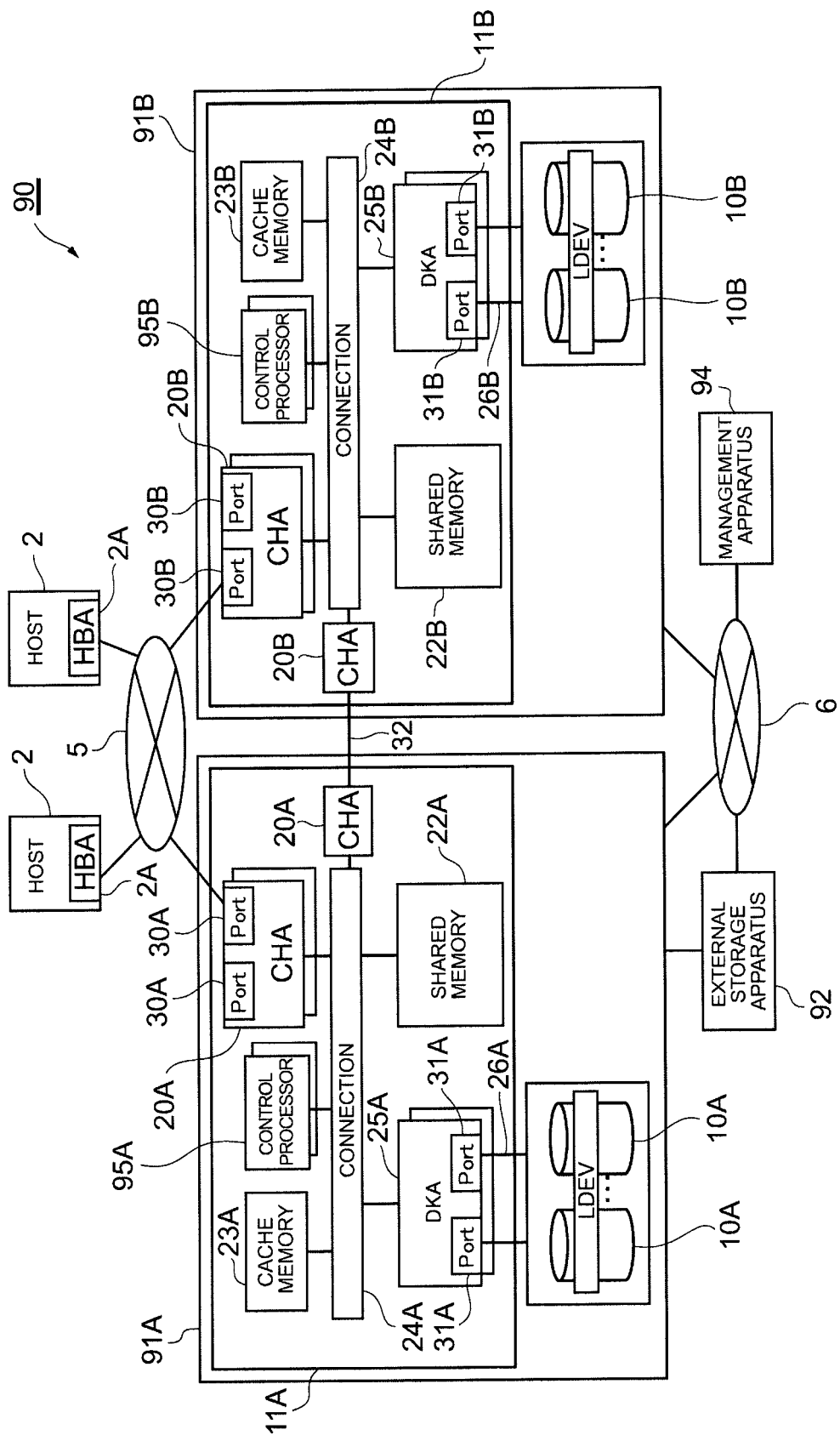
FIG. 21 is a block diagram showing the overall configuration of the computer system according to the second embodiment.

FIG. 21 with the same reference numerals for the portions corresponding to those in FIG. 1 shows the computer system 90 according to the second embodiment. The computer system 90 is configured the same as the computer system 1 according to the first embodiment excluding the point that a storage apparatus (this is hereinafter referred to as the "external storage apparatus") 92 is externally connected to the migration source storage apparatus 91A.

Figure 22:
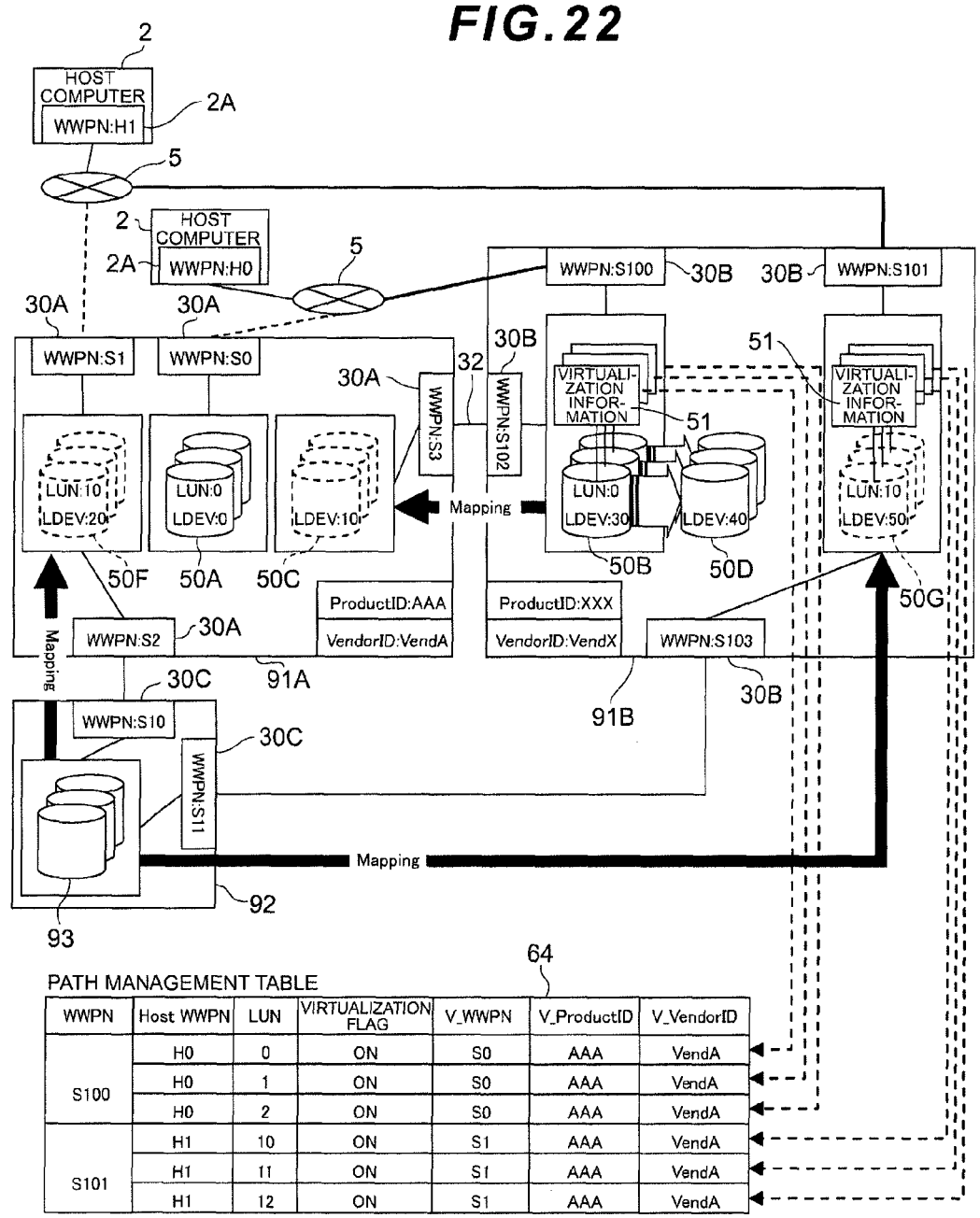
FIG. 22 is a conceptual diagram explaining the storage migration method according to the second embodiment.

FIG. 22 shows the outline off the storage migration method according to the second embodiment (this is hereinafter referred to as the "second storage migration method"). In FIG. 22, the same reference numerals are given to the portions corresponding to those of FIG. 5. If the external storage apparatus 92 is externally connected to the migration source storage apparatus 91A, as described above with reference to FIG. 4, a virtual device 50F mapped with the logical device (this is hereinafter referred to as the "external logical device") 93 in the external storage apparatus 92 is formed in the migration source storage apparatus 91A, and the virtual device 50F is provided to the host computer 2. The data I/O request from the host computer 2 for performing data I/O to the virtual device 50F is transferred to the external storage apparatus 92, and the external storage apparatus 92 performs the reading or writing of data from or to the external logical device 93 according to the foregoing data I/O request.

As described above, in cases where the external storage apparatus 92 is externally connected to the migration source storage apparatus 91A, since the data itself to be written or read by the host computer 2 to or from the virtual device 50F exists in the external storage apparatus 92, migration of the storage apparatus from the migration source storage apparatus 91A to the migration destination storage apparatus 91B can be performed merely by switching the mapping destination of the external logical device 93 in the external storage apparatus 92 to the virtual device 50G in the migration destination storage apparatus 91B.

Thus, in the case of this embodiment, the virtual device 50G is formed in the migration destination storage apparatus 91B by being associated with each of the external logical devices 93 in the external storage apparatus 92 and the mapping destination of the external logical device 93 is switched to the virtual device 50G, and the information related to the virtual device 50F mapped with the external logical device 93 up to that time is set as the virtualization information in the virtual device 50G of the migration destination storage apparatus 91B in order to migrate the connection destination of the external storage apparatus 92 to the migration destination storage apparatus 91B.

Note that the contents of the processing for switching the access destination of the host computer 2 from the migration source logical device 50A in the migration source storage apparatus 91A to the migration destination logical device 50B in the migration destination storage apparatus 91B are the same as the first embodiment, and the explanation thereof is omitted below.

Figure 23:
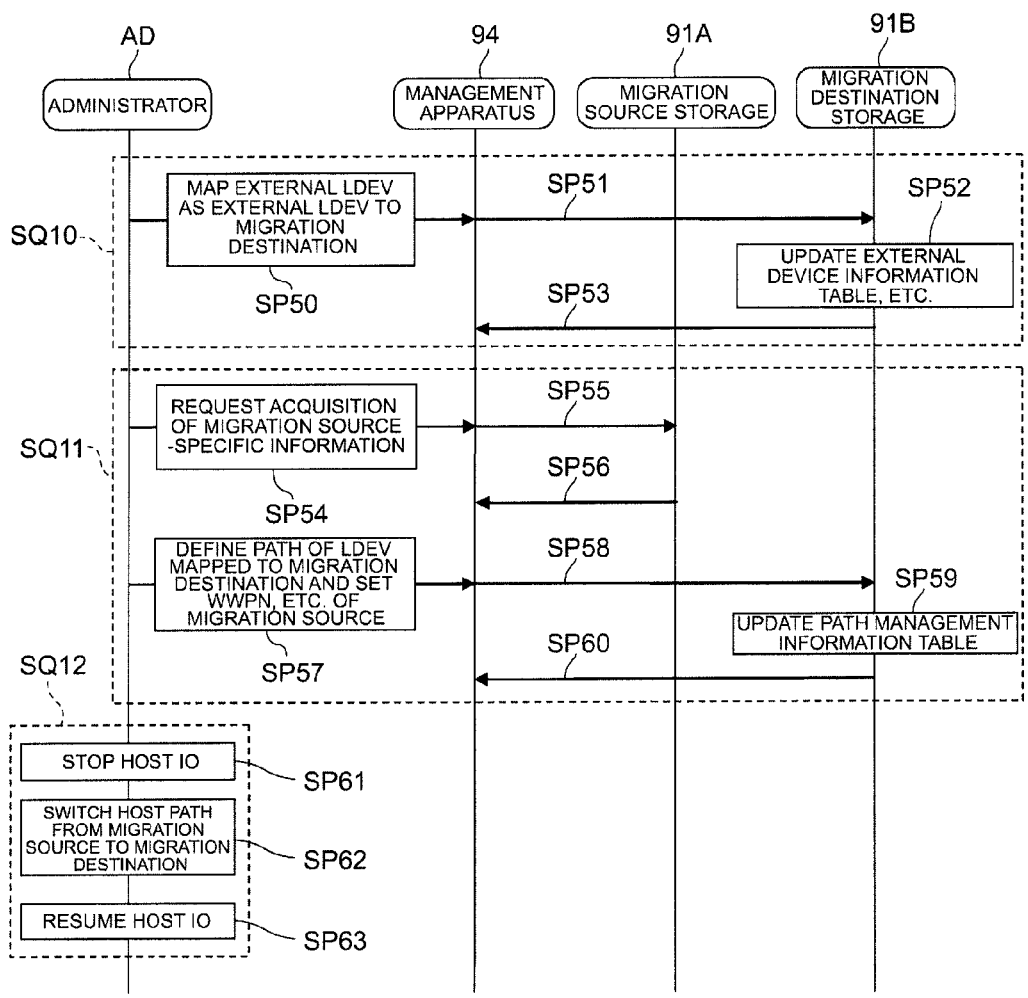
FIG. 23 is a sequence diagram showing the processing flow in the second storage migration method.

FIG. 23 shows the processing routine of the processing (this is hereinafter referred to as the "mapping destination switching processing") for switching the mapping destination of the external logical device 93 in the external storage apparatus 92 to the virtual device 50G in the migration destination storage apparatus 91B among the storage migration processing that is executed in the computer system 90 according to this embodiment upon exchanging (migrating) the migration source storage apparatus 91A with the migration destination storage apparatus 91B. The mapping destination switching processing is configured from three sequences; namely, a first mapping sequence SQ10, a virtualization information setting sequence SQ11 and a storage switching sequence SQ12.

Foremost, the administrator AD operates the management apparatus 94 to form the virtual device 50G in the migration destination storage apparatus 91B by associating it with each of the external logical devices 93 of the external storage apparatus 92, and map the external logical device 93 to the virtual device 50G (SP50). Consequently, a mapping command according to the foregoing operations of the administrator AD is sent from the management apparatus 94 to the migration destination storage apparatus 91B (SP51).

When the control processor 95B (FIG. 21) of the migration destination storage apparatus 91B receives the foregoing mapping command, it updates the logical device management table 60 (FIG. 7), the virtual pool device management table 61 (FIG. 8) and the external device information table 62 (FIG. 9), respectively, based on the foregoing mapping command (SP52).

Specifically, the control processor 95B forms a virtual pool device by associating it with each of the external logical devices 93, and stores the virtual pool device number, type and size (capacity) of each of the formed virtual pool devices in the virtual pool device number column 61A, the type column 61B and the size column 61C, respectively, of the newly allocated entry in the virtual pool device management table 61. Moreover, the control processor 95B stores the RAID level of the corresponding external logical device 93 and the parity group ID of the parity group 80 (FIG. 12) forming the external logical device 93 in the RAID level column 61D and the parity group ID column 61E, respectively, of the foregoing entry.

Moreover, the control processor 95B stores the logical device number assigned to the virtual device 50G defined in the foregoing virtual pool device by being associated with each of the external logical devices 93 and the size of such virtual device 50C in the logical device number column 60A and the size column 60B, respectively, of the newly allocated entry in the logical device management table 60, and additionally stores the virtual pool device number of the virtual pool device to which the virtual device 50G is affiliated in the affiliated virtual pool device number column 60C of the foregoing entry.

In addition, the control processor 95B stores the virtual pool device number of each of the virtual pool devices formed by being associated with each of the external logical devices 93 in the virtual pool device number column 62A of the newly allocated entry in the external device information table 62, respectively, and additionally stores the port number of the port (port connected to the corresponding external logical device 93 in the migration destination storage apparatus 3B) 30B associated with the corresponding virtual pool device in the self storage-side port number column 62F of each entry, respectively.

Moreover, the control processor 95B stores the path number of the path connecting the corresponding virtual pool device and the migration destination logical device 50B thereof in the path number column 62C of each entry, and additionally stores the current status of the corresponding path in the path status column 62G of the foregoing entries. In addition, the control processor 95B stores the serial number of the external storage apparatus 92 in the external-side apparatus serial number column 62B of each entry, stores the WWPN of the port 30C (FIG. 22) on the external storage apparatus 92 side connected to the corresponding virtual pool device in the external-side WWPN column 62D of the foregoing entries, and additionally stores the LUN of the corresponding external logical device 93 in the external-side LUN column 62E of the foregoing entries.

When the control processor 95B completes updating the logical device management table 60, the virtual pool device management table 61 and the external device information table 62, it notifies the update completion to the management apparatus 4 (SP53).

Figure 24:
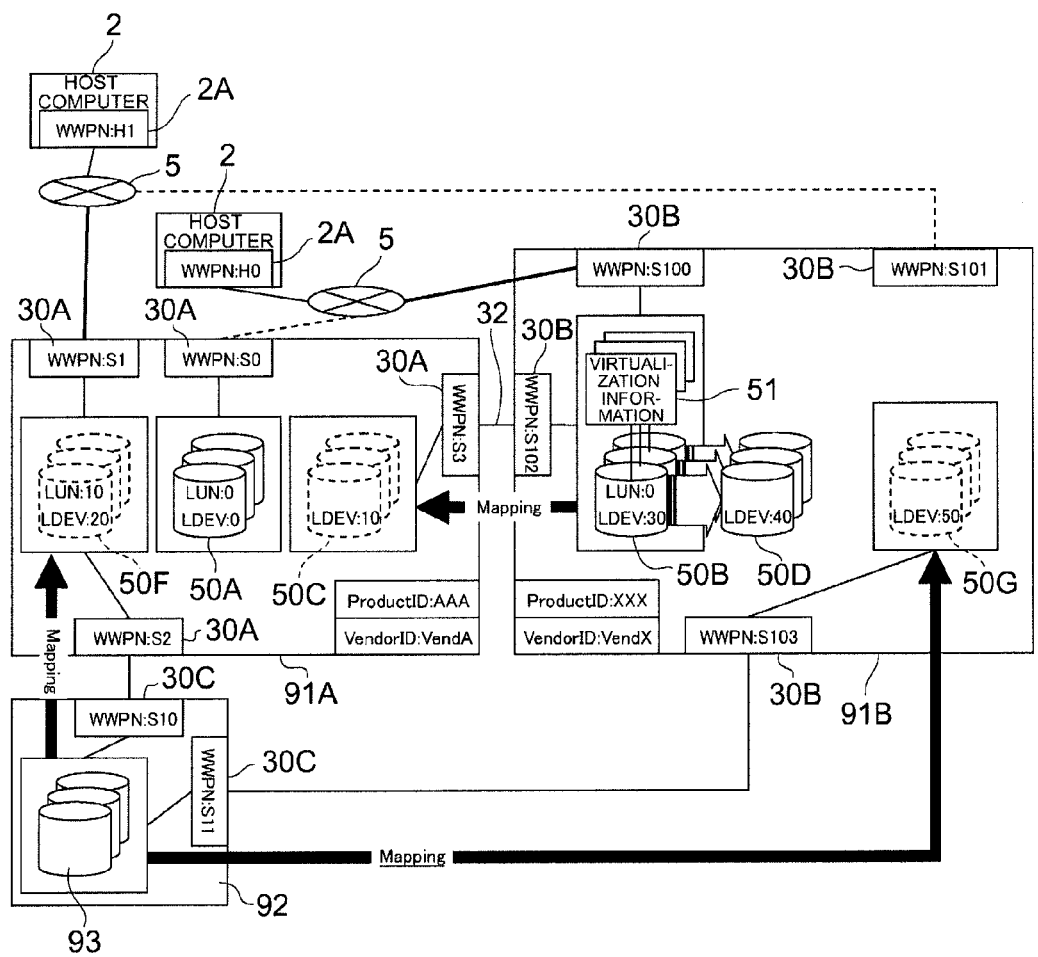
FIG. 24 is a conceptual diagram explaining the processing flow in the second storage migration method.

Based on the foregoing processing from step SP50 to step SP53, as shown in FIG. 24, each of the external logical devices 93 in the external storage apparatus 92 is mapped to the corresponding virtual device 50G provided in the migration destination storage apparatus 91B, respectively.

Subsequently, the administrator AD issues a command to the management apparatus 94 for acquiring the WWPN of each corresponding port 30A in the migration source storage apparatus 91A and the vendor ID and the serial number of the migration source storage apparatus 91A (SP54). Here, "each corresponding port" refers to each port 30A of the migration source storage apparatus 3A which is connected to the virtual device 50F (FIG. 22) that was mapped with the external logical device 93 of the external storage apparatus 92 up to that time. Consequently, an apparatus-specific information notification request for requesting the notification of such WWPN, vendor ID and serial number is sent from the management apparatus 94 to the migration source storage apparatus 91A (SP55).

When the control processor 95A of the migration source storage apparatus 91A receives the foregoing apparatus-specific information notification request, it sends the WWPN of each corresponding port 30A in the self storage apparatus and the vendor ID and serial number of the self storage apparatus to the management apparatus 94 (SP56). Consequently, the WWPN of each corresponding port 30A in the migration source storage apparatus 91A and the vendor ID and serial number of the migration source storage apparatus 91A that were acquired by the management apparatus 94 are displayed on the management apparatus 94.

The administrator AD thereafter defines the respective paths to the external logical device 93 mapped to the virtual device 50G of the migration destination storage apparatus 91B at step SP52 on the screen of the management apparatus 94 based on the WWPN of each corresponding port 30A in the migration source storage apparatus 91A and the vendor ID and serial number of the migration source storage apparatus 91A displayed on the management apparatus 94 as described above (SP57).

Moreover, the administrator AD sets the WWPN of each port 30A of the migration source storage apparatus 91A connected to the external logical device 93 as the virtual WWPN of the port 30B connected to the foregoing virtual device 50G in the migration destination storage apparatus 91B, respectively, and sets the vendor ID and serial number of the migration source storage apparatus 91A as the virtual vendor ID and the virtual serial number of the migration destination storage apparatus 91B (SP57). Consequently, a virtualization information setting command corresponding to the foregoing operations of the administrator AD is sent from the management apparatus 94 to the migration destination storage apparatus 91B (SP58).

When the control processor 95B of the migration destination storage apparatus 91B receives the foregoing virtualization information setting command, it updates the path management table 64 (FIG. 11) based on the virtualization information setting command (SP59). Specifically, the control processor 95B stores the corresponding virtual WWPN that was designated in the virtualization information setting request in the virtual WWPN column 64E of each entry corresponding to each port 30B, among the entries of the path management table 64, to which the virtual WWPN was notified in the virtualization information setting request, and stores the virtual serial number and the virtual vendor ID designated in the virtualization information setting request in the virtual serial number column 64F and the virtual vendor ID column 64G of the foregoing entries, respectively. Moreover, the control processor 95B sets the virtualization flag stored in the virtualization flag column 64D of the foregoing entries to "ON".

When the control processor 95B completes updating the path management table 64, it notifies the update completion to the management apparatus 94 (SP60).

Based on the foregoing processing from step SP54 to step SP60, the WWPN of the corresponding port 30A connected to the external logical device 93 of the migration source storage apparatus 91A is set as the virtual WWPN of the port 30B for each path connecting the port 30B connected to the external logical device 93 in the migration destination storage apparatus 91B and the corresponding virtual device 50G, and the vendor ID and serial number of the migration source storage apparatus 91A are respectively set as the virtual vendor ID and virtual serial number of the migration destination storage apparatus 91B.

Subsequently, the administrator AD operates the host computer 2 (for example, shuts down the required application software) so that the host computer 2 will not issue a data I/O request (I/O) to the virtual device 50F of the migration source storage apparatus 91A (SP61).

In addition, the administrator AD switches the connection destination of the host computer 2 from the migration source storage apparatus 91A to the migration destination storage apparatus 91B, for example, by switching the connection destination of the cable connecting the host computer 2 and the migration source storage apparatus 91A (SP62). Moreover, the administrator AD operates the host computer 2 (for example, restarts the required application software) so as to resume issuing the data I/O request from the host computer 2 to the migration source storage apparatus 91A (in reality to the migration destination storage apparatus 91B) (SP63).

Figure 25:
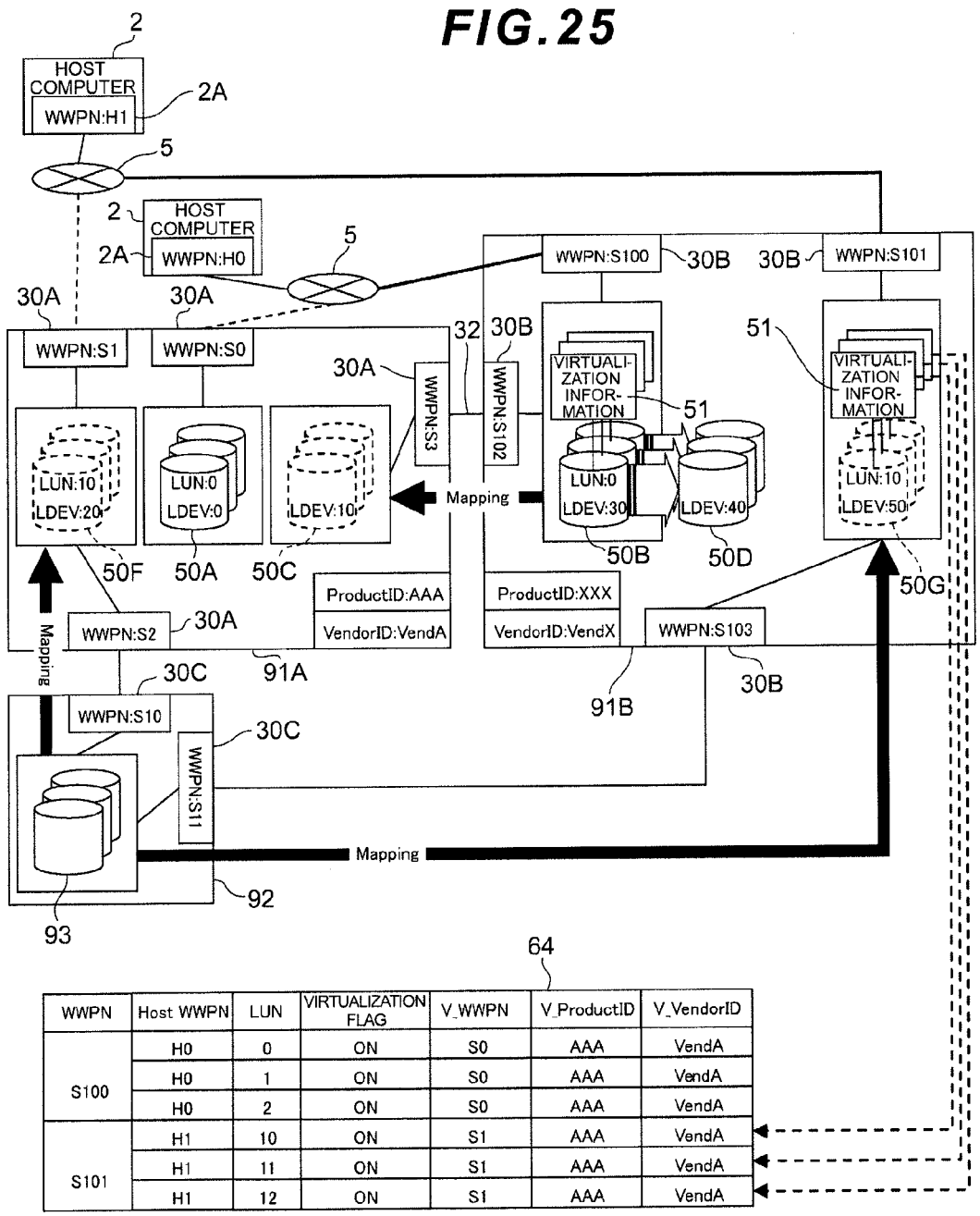
FIG. 25 is a conceptual diagram explaining the processing flow in the second storage migration method.

Based on the foregoing processing from step SP61 to step SP63, as shown in FIG. 25, the mapping destination of the external logical device 93 in the external storage apparatus 92 is switched to the virtual device 50G in the migration destination storage apparatus 91B, and the data I/O request targeting the external logical device 93 is provided to the migration destination storage apparatus 91B as a data I/O request targeting the virtual device 50G of the migration destination storage apparatus 91B.

As described above, according to the second storage migration method, even in cases where the external storage apparatus 92 is connected to the migration source storage apparatus 91, as with the first embodiment, a storage apparatus can be migrated based on the same operation regardless of the type of OS of the host computer, and without affecting the I/O performance during normal times. It is thereby possible to simplify the migration process of a storage apparatus while avoiding the performance degradation of the overall system.

(3) Third Embodiment

In FIG. 1, reference numeral 100 shows the computer system according to the third embodiment. The computer system 100 is configured the same as the computer system 1 according to the first embodiment excluding the point that the migration source storage apparatus 101A is not equipped with the external connection function and, consequently, the processing contents of the storage migration method of migrating a storage apparatus from the migration source storage apparatus 101A to the migration destination storage apparatus 101B are different.

Figure 26:
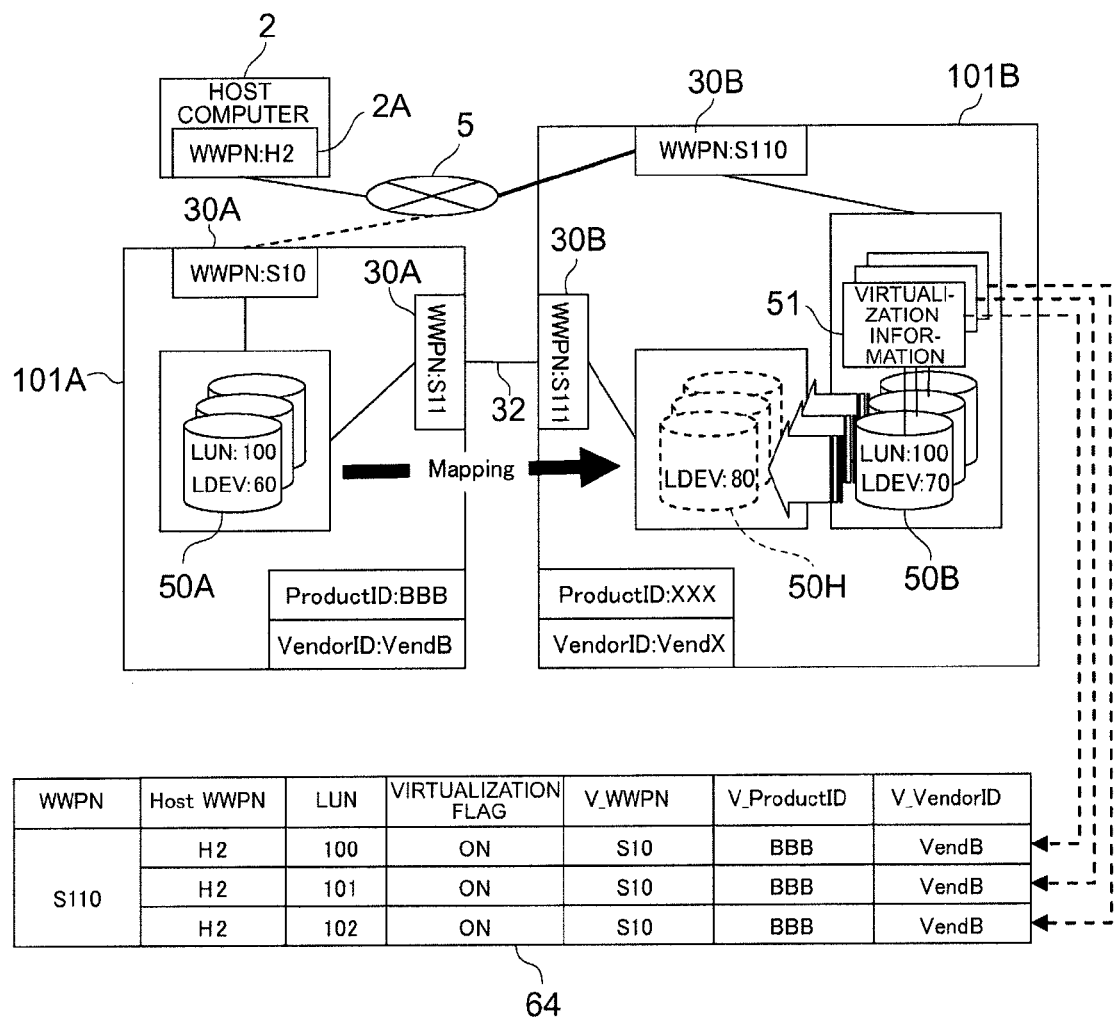
FIG. 26 is a conceptual diagram explaining the processing flow in the second storage migration method.

FIG. 26 with the same reference numerals for the portions corresponding to those in FIG. 5 shows the outline off the storage migration method according to the third embodiment (this is hereinafter referred to as the "third storage migration method"). If the migration source storage apparatus 101A is not equipped with the external connection function, the migration destination logical device 50B cannot be mapped as an external logical device to the migration source logical device 50A.

Thus, with the storage migration method according to this embodiment (this is hereinafter referred to as the "third storage migration method"), a virtual device 50H is formed in the migration destination storage apparatus 101B by being associated with each of the migration source logical devices 50A in the migration source storage apparatus 101A, and the corresponding migration destination logical device 50B of the migration destination storage apparatus 101B is mapped as the external logical device to the virtual device 50H.

Figure 27:
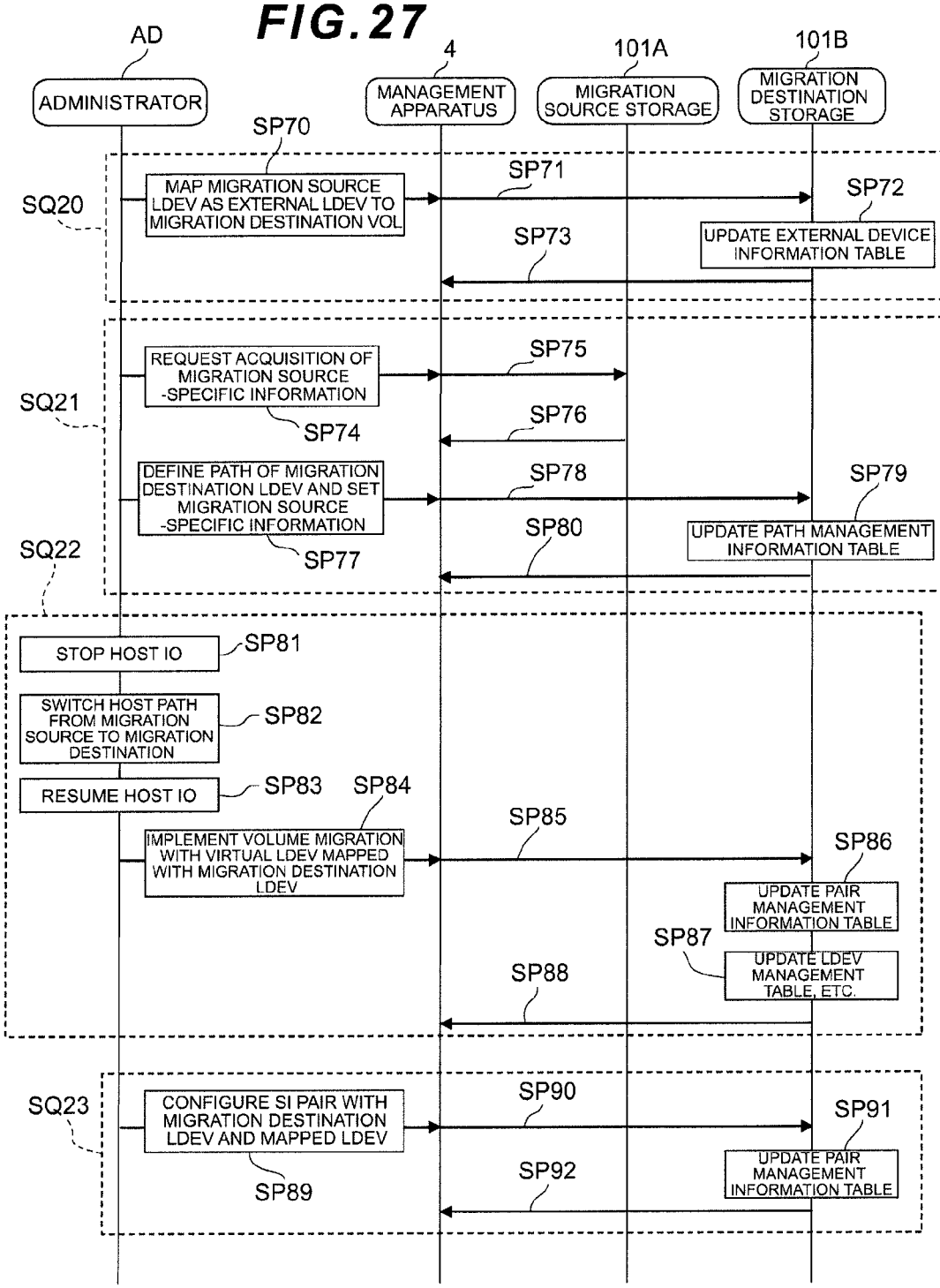
FIG. 27 is a sequence diagram showing the processing flow in the third storage migration method.

FIG. 27 shows the processing routine of the storage migration processing upon migrating (exchanging) the migration source storage apparatus 101A to the migration destination storage apparatus 101B based on the foregoing third storage migration method. This storage migration processing is configured from a first mapping sequence SQ20, a virtualization information setting sequence SQ21, a storage switching sequence SQ22 and a second mapping sequence SQ23.

Foremost, the administrator AD operates the management apparatus 103 to map each of the migration source logical devices 50A in the migration source storage apparatus 101A as the external logical device to the corresponding migration destination logical device 50B in the migration destination storage apparatus 101B, respectively (SP70). Consequently, a mapping command according to the foregoing operations of the administrator AD is sent from the management apparatus 103 to the migration destination storage apparatus 101B (SP71).

When the control processor 102B (FIG. 1) of the migration destination storage apparatus 101B receives the foregoing mapping command, it updates the logical device management table 60 (FIG. 7), the virtual pool device management table 61 (FIG. 8) and the external device information table 62 (FIG. 9), respectively, based on the mapping command (SP72).

Specifically, the control processor 102B forms a virtual pool device by associating it with each of the migration source logical devices 50A, and stores the virtual pool device number, type and size (capacity) of each of the formed virtual pool devices in the virtual pool device number column 61A, the type column 61B and the size column 61C, respectively, of the newly allocated entry in the virtual pool device management table 61. Moreover, the control processor 102B stores the RAID level of the corresponding migration source logical device 50A and the parity group ID of the parity group 80 (FIG. 12) forming the migration source logical device 50A in the RAID level column 61D and the parity group ID column 61E, respectively, of the foregoing entry.

Moreover, the control processor 102B stores the logical device number assigned to each of the virtual devices 50H defined in the foregoing virtual pool device by being associated with each of the migration source logical devices 50A and the size of such virtual devices 50H in the logical device number column 60A and the size column 60B, respectively, of the newly allocated entry in the logical device management table 60, and additionally stores the virtual pool device number of the virtual pool device to which the virtual device 50H is affiliated in the affiliated virtual pool device number column 60C of the foregoing entry.

In addition, the control processor 102B stores the virtual pool device number of each of the virtual pool devices formed by being associated with each of the migration source logical devices 50A in the virtual pool device number column 62A of the newly allocated entry in the external device information table 62, respectively, and additionally stores the port number of the port (port connected to the corresponding migration destination logical device 50B in the migration destination storage apparatus 3B) 30A associated with the corresponding virtual pool device in the self storage-side port number column 62F of each entry, respectively.

Moreover, the control processor 102B stores the path number of the path connecting the corresponding virtual pool device and the migration destination logical device 50B thereof in the path number column 62C of each entry, and additionally stores the current status of the corresponding path in the path status column 62G of the foregoing entries. In addition, the control processor 102B stores the serial number of the migration source storage apparatus 101A in the external-side apparatus serial number column 62B of each entry, stores the WWPN of the port 30A on the migration destination storage apparatus 101B side connected to the corresponding virtual pool device in the external-side WWPN column 62D of the foregoing entries, and additionally stores the LUN of the corresponding migration destination logical device 50B in the external-side LUN column 62E of the foregoing entries.

When the control processor 102B completes updating the logical device management table 60, the virtual pool device management table 61 and the external device information table 62, it notifies the update completion to the management apparatus 103 (SP73).

Figure 28:
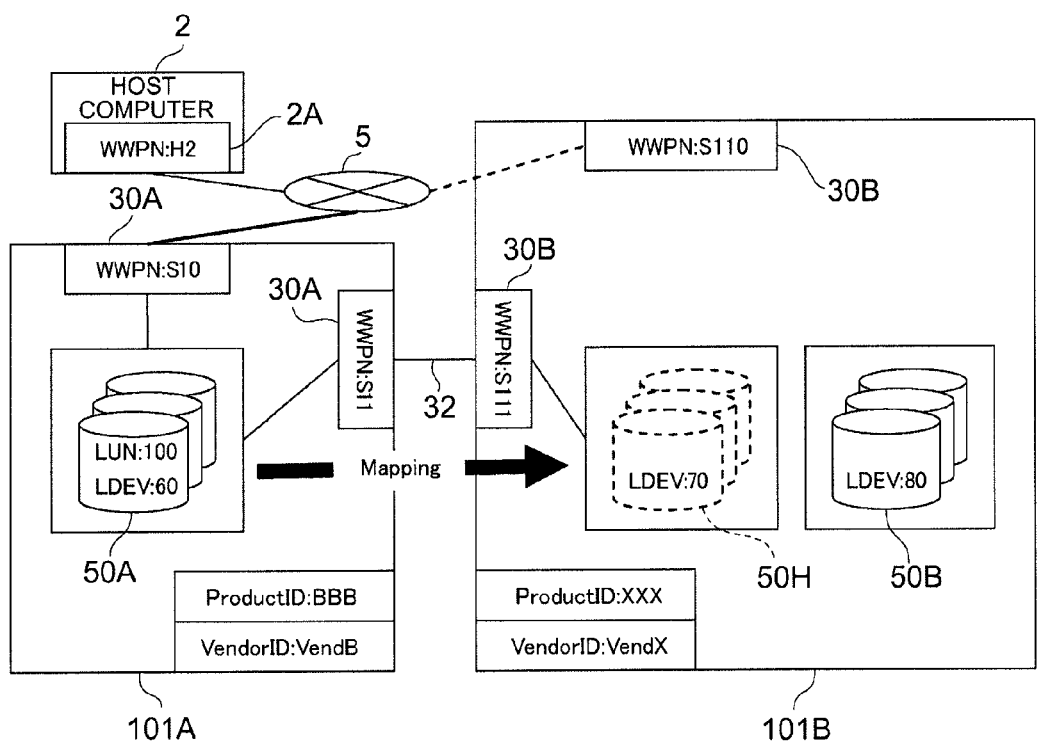
FIG. 28 is a conceptual diagram explaining the processing flow in the third storage migration method.

Based on the foregoing processing from step SP70 to step SP73, as shown in FIG. 28, the corresponding migration source logical device 50A is mapped as an external logical device to each of the virtual devices 50H formed in the migration destination storage apparatus 101B in correspondence with each of the migration source logical devices 50A.

Subsequently, the administrator AD issues a command to the management apparatus 103 for acquiring the WWPN of each corresponding port 30A in the migration source storage apparatus 101A and the vendor ID and the serial number of the migration source storage apparatus 101A (SP74). Here, "each corresponding port" refers to each port 30A connected to the migration source logical device 50A in the migration source storage apparatus 101A. Consequently, an apparatus-specific information notification request for requesting the notification of such WWPN, vendor ID and serial number is sent from the management apparatus 103 to the migration source storage apparatus 101A (SP75).

When the control processor 102A of the migration source storage apparatus 101A receives the foregoing apparatus-specific information notification request, it sends the WWPN of each corresponding port 30A in the self storage apparatus and the vendor ID and serial number of the self storage apparatus to the management apparatus 103 (SP76). Consequently, the WWPN of each corresponding port 30A in the migration source storage apparatus 101A and the vendor ID and serial number of the migration source storage apparatus 101A that were acquired by the management apparatus 103 are displayed on the management apparatus 103.

The administrator AD thereafter defines the respective paths to the virtual device 50H in the migration destination storage apparatus 101B to which was mapped the migration source logical device 50A in the migration source storage apparatus 101A as the external logical device at step SP72 based on the WWPN of each corresponding port 30A in the migration source storage apparatus 101A and the vendor ID and serial number of the migration source storage apparatus 101A displayed on the management apparatus 103 as described above (SP77).

Moreover, the administrator AD sets the WWPN of each port 30A of the migration source storage apparatus 101A displayed on the management apparatus 103 as the virtual WWPN of the corresponding port 30B of the migration destination storage apparatus 3B (that is, the port 30B connected to the virtual device 50H that was associated with the migration source logical device 50A connected to the port 30A), respectively, and sets the vendor ID and serial number of the migration source storage apparatus 101A displayed on the management apparatus 103 as the virtual vendor ID and the virtual serial number of the migration destination storage apparatus 101B (SP77). Consequently, a virtualization information setting command corresponding to the foregoing operations of the administrator AD is sent from the management apparatus 103 to the migration destination storage apparatus 101B (SP78).

When the control processor 102B of the migration destination storage apparatus 101B receives the foregoing virtualization information setting command, it updates the path management table 64 (FIG. 11) based on the virtualization information setting command (SP79). Specifically, the control processor 102B stores the corresponding virtual WWPN that was designated in the virtualization information setting request in the virtual WWPN column 64E of each entry corresponding to each port 30B, among the entries of the path management table 64, to which the virtual WWPN was notified in the virtualization information setting request, and stores the virtual serial number and the virtual vendor ID designated in the virtualization information setting request in the virtual serial number column 64F and the virtual vendor ID column 64G of the foregoing entries, respectively. Moreover, the control processor 102B sets the virtualization flag stored in the virtualization flag column 64D of the foregoing entries to "ON".

When the control processor 102B completes updating the path management table 64, it notifies the update completion to the management apparatus 103 (SP80).

Figure 29:
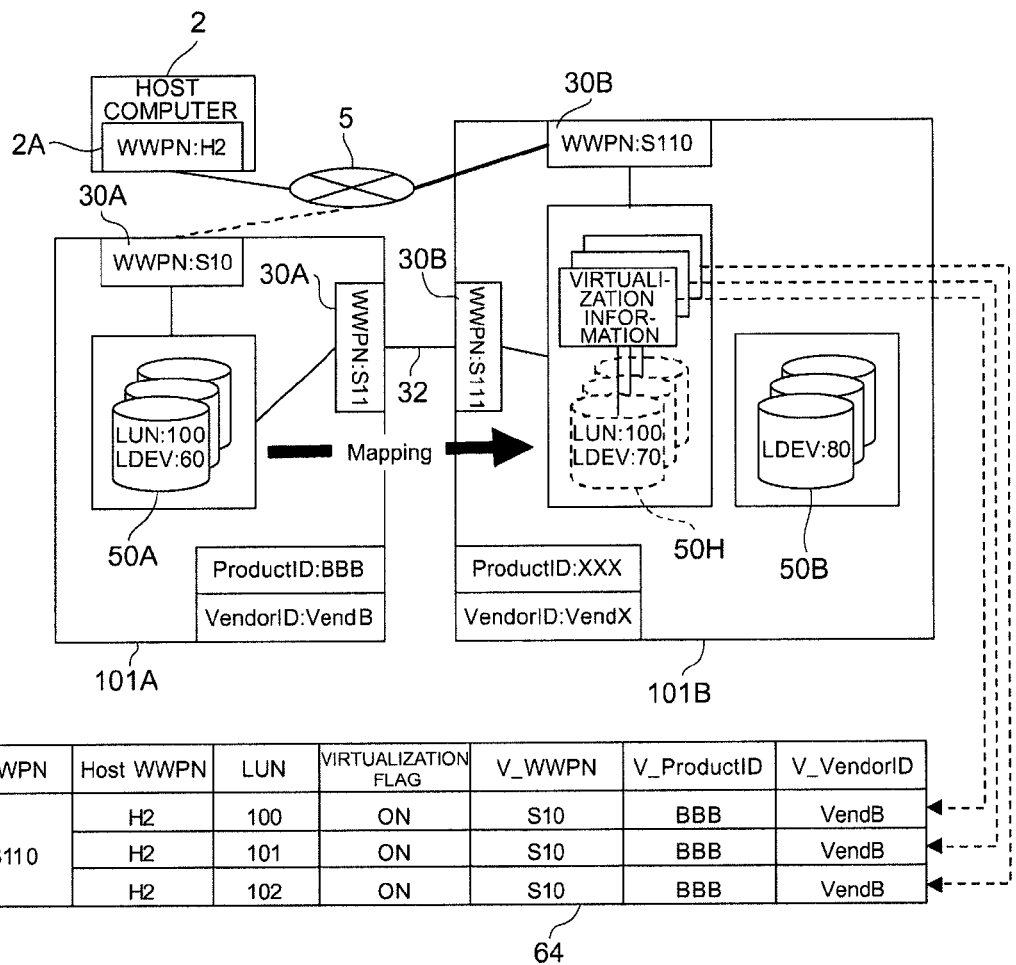
FIG. 29 is a conceptual diagram explaining the processing flow in the third storage migration method.

Based on the foregoing processing from step SP74 to step SP80, as shown in FIG. 29, the WWPN of the corresponding port 30A of the migration source storage apparatus 101A is set as the virtual WWPN of the port 30B for each path connecting the virtual device 50H in the migration destination storage apparatus 101B and the corresponding port 30B, and the vendor ID and serial number of the migration source storage apparatus 101A are respectively set as the virtual vendor ID and virtual serial number of the migration destination storage apparatus 101B.

Subsequently, the administrator AD operates (for example, shuts down) the host computer 2 so that the host computer 2 will not issue a data I/O request (I/O) to the migration source storage apparatus 101A (SP81), and to change the connection destination of the host computer 2 from the migration source storage apparatus 101A to the migration destination storage apparatus 101B (SP82). Moreover, the administrator AD operates (for example, restarts) the host computer 2 so as to resume issuing the data I/O request from the host computer 2 to the migration source storage apparatus 101A.

Subsequently, the administrator AD operates the management apparatus 103 and forms a volume migration pair with the virtual device 50H mapped with the migration source logical device 50A in the migration destination storage apparatus 101A as the migration source, and the migration destination logical device 50B associated with the virtual device 50H as the migration destination, and issues a command for executing the volume migration processing from the virtual device 50H to the migration destination logical device 50B (SP84). Consequently, a volume migration execution command according to the foregoing operation of the administrator AD is sent from the management apparatus 103 to the migration destination storage apparatus 101B (SP85).

Figure 30:
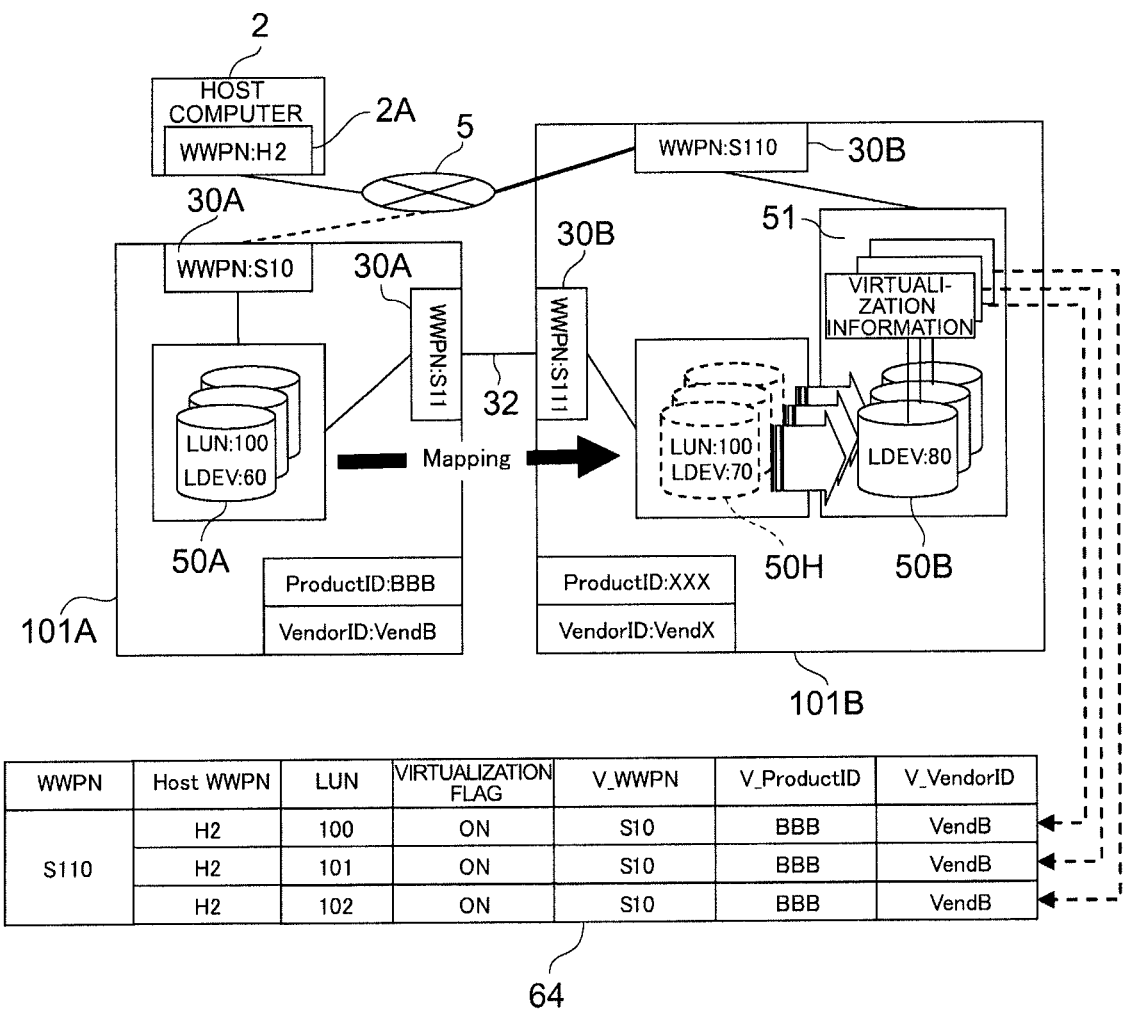
FIG. 30 is a conceptual diagram explaining the processing flow in the third storage migration method.

When the control processor 102B of the migration destination storage apparatus 101B receives the foregoing volume migration execution command, it updates the pair management information table 63 (FIG. 10) so as to form a volume migration pair with the corresponding virtual device 50H and the migration destination logical device 50B based on the foregoing volume migration execution command as shown in FIG. 30 (SP86).

Specifically, the control processor 102B allocates an unused entry in the pair management information table 63, and stores the pair number that was assigned to the volume migration pair in the management number column 63A of that entry. Moreover, the control processor 102B stores, in the primary logical device number column 63B of that entry, the logical device number of the logical device (virtual device 50H) designated as the primary device in the volume migration execution command, and stores, in the secondary logical device number column 63C of that entry, the logical device number of the logical device (migration destination logical device 50B) designated as the secondary device in the volume migration execution command. In addition, the control processor 102B stores the pair status of the foregoing volume migration pair in the pair status column 63D of that entry.

Consequently, the data stored in the virtual device 50H is initially copied to the migration destination logical device 50B, but since the virtual device 50H is an insubstantial logical device, the data stored in the migration source logical device 50A is initially copied to the migration destination logical device 50B based on the remote copy function of the migration source storage apparatus 101A and the migration destination storage apparatus 101B. The data contents of the migration source logical device 50A and the data contents of the migration destination logical device 50B are thereby synchronized.

Moreover, the control processor 102B updates the logical device management table 60 so as to switch the relation between the virtual device 50H and the migration destination logical device 50B forming the foregoing volume migration pair based on the foregoing volume migration execution command (SP87). Specifically, the control processor 102B switches the logical device number stored in the logical device number column 60A of the entry corresponding to the virtual device 50H of the logical device management table 60 and the logical device number stored in the logical device number column 60A of the entry corresponding to the migration destination logical device 50B of the logical device management table 60.

When the control processor 102B completes updating the pair management information table 63 and the logical device management table 60, it notifies the update completion to the management apparatus 103 (SP88).

Based on the processing of foregoing step SP81 to step SP88, the virtual device 50H mapped with the migration source logical device 50A is switched with the migration destination logical device 50B, and data from the host computer 2 is thereafter stored in the new migration destination logical device 50B after the switch (corresponds to the virtual device 50H before the switch).

Subsequently, the administrator AD operates the management apparatus 103 and configures a copy pair with the virtual device 50H mapped with the migration source logical device 50A in the migration destination storage apparatus 101A as the migration destination, and the migration destination logical device 50B associated with the virtual device 50H as the migration source (SP89). Consequently, a copy pair configuration command according to the foregoing operation of the administrator AD is sent from the management apparatus 4 to the migration destination storage apparatus 3B (SP90).

When the control processor 102B of the migration destination storage apparatus 3B receives the foregoing copy pair configuration command, it updates the pair management information table 63 (FIG. 10) based on the copy pair configuration command (SP91).

Specifically, the control processor 102B allocates an unused entry in the pair management information table 63, and stores the pair number assigned to the foregoing copy pair in the management number column 63A of that entry. Moreover, the control processor 102B stores, in the primary logical device number column 63B of that enry, the logical device number of the logical device (migration destination logical device 50B) designated as the primary device in the copy pair configuration command, and stores, in the secondary logical device number column 63C of that entry, the logical device number assigned to the logical device (corresponding virtual device 50H) designated as the secondary device in the copy pair configuration command. In addition, the control processor 102B stores the pair status of the foregoing copy pair in the pair status column 63D of that entry.

When the migration destination storage apparatus 101B completes updating the pair management information table 63, it notifies the update completion to the management apparatus 4 (SP92).

Based on the foregoing processing from step SP89 to step SP92, as shown in FIG. 26, the copy pair with the migration destination logical device 50B as the primary device and the corresponding virtual device 50H associated with the migration destination logical device 50B as the secondary device is configured in the migration destination storage apparatus 101B.

Consequently, when data is written from the host computer 2 into the migration destination logical device 50B, although such data is copied to the virtual device 50H based on the same-chassis internal copy function of the migration destination storage apparatus 101B, since the virtual device 50H is an insubstantial logical device, such data is consequently is copied to the migration source logical device 50A of the migration source storage apparatus 101A via the external connection port 30B of the migration destination storage apparatus 101B based on the external connection function of the migration destination storage apparatus 101B. The status where the data content of the migration source logical device 50A and the data content of the migration destination logical device 50B are synchronized is thereby maintained.

Accordingly, when it is necessary to return the host path to the migration source storage apparatus 101A due to the malfunction of the migration destination storage apparatus 101B or the failure of the host path to the migration destination storage apparatus 101B, the host path can be returned to the migration source storage apparatus 101A side based on the same processing as step SP81 to step SP83.

Note that the migration from the migration source storage apparatus 101A to the migration destination storage apparatus 101B is thereafter completed as a result of separating the migration source storage apparatus 101A from the host computer 2.

As described above, according to the third storage migration method, even in cases where the migration source storage apparatus 101A is not equipped with the external connection function, as with the first embodiment, a storage apparatus can be migrated based on the same operation regardless of the type of OS of the host computer 2, and without affecting the I/O performance during normal times. It is thereby possible to simplify the migration process of a storage apparatus while avoiding the performance degradation of the overall system.

(4) Fourth Embodiment

As described above, in the first to third storage migration methods, a plurality of migration source storage apparatuses can be migrated to one migration destination storage apparatus since the WWPN of the corresponding port 30A of the migration source storage apparatus 3A, 91A, 101A and the serial number and vendor ID of the migration source storage apparatus 3A, 91A, 101A are set as the virtualization information 51 for each port 30B of the migration destination storage apparatus 3B, 91B, 101B.

Figure 31:
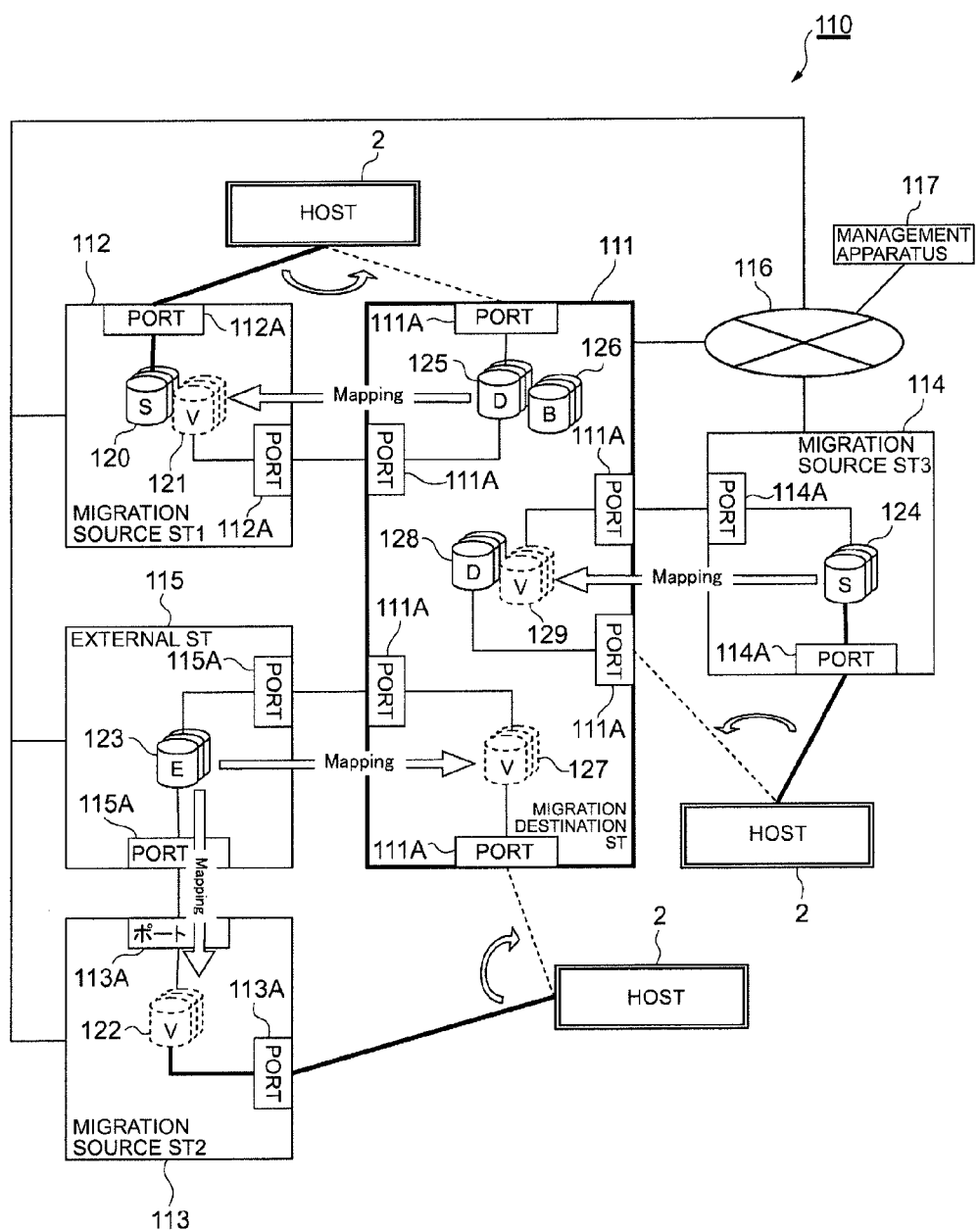
FIG. 31 is a block diagram schematically showing the overall configuration of the computer system according to the fourth embodiment.

FIG. 31 shows the schematic configuration of the computer 110 according to the fourth embodiment which gives consideration to the foregoing point. In this computer system 110, three migration source storage apparatuses (these are hereinafter respectively referred to as the "first to third migration source storage apparatuses") 112 to 114 are connected to one migration destination storage apparatus 111, and an external storage apparatus 115 is externally connected to the second migration source storage apparatus 113. In addition, the migration destination storage apparatus 111 and the first to third migration source storage apparatuses 112 to 114 are connected to a management apparatus 117 via a LAN 116.

The first migration source storage apparatus 112 is a storage apparatus having the same configuration and same functions as the migration source storage apparatus 3A according to the first embodiment described above with reference to FIG. 1. The first migration source storage apparatus 112 is provided with a migration source logical device 120 corresponding to the migration source logical device 50A of FIG. 5 and a virtual device 121 corresponding to the virtual device 50C of FIG. 5.

The second migration source storage apparatus 113 is a storage apparatus having the same configuration and same functions as the migration source storage apparatus 91A according to the second embodiment described above with reference to FIG. 21. The second migration source storage apparatus 113 is provided with a virtual device 122 corresponding to the virtual device 50F of FIG. 22, and this virtual device 122 is provided to the host computer 2.

Moreover, the external storage apparatus 115 is a storage apparatus having the same configuration and same functions as the external storage apparatus 92 according to the second embodiment described above with reference to FIG. 21. The external storage apparatus 115 is provided with an external logical device 123, and this external logical device 123 is mapped to the virtual device 122 of the second migration source storage apparatus 113.

In addition, the third migration source storage apparatus 114 is a storage apparatus having the same configuration and same functions as the migration source storage apparatus 101A according to the third embodiment described above with reference to FIG. 1. The third migration source storage apparatus 114 is provided with a migration source logical device 124 corresponding to the migration source logical device 50A of FIG. 26.

Meanwhile, the migration destination storage apparatus 111 is a storage apparatus equipped with the same-chassis internal copy function and the external connection function, has the same hardware configuration as the migration destination storage apparatus 3B according to the first embodiment described above with reference to FIG. 1, and is further equipped with a function capable of executing the various types of processing relating to the first to third storage migration method described above with reference to the first to third embodiments.

The computer system 110 is thereby able to migrate the first to third migration source storage apparatuses 112 to 114 to the first to third storage migration method by using the first to third storage migration methods.

The management apparatus 117 is configured, for example, from a general-purpose server apparatus. The management apparatus 117 comprises, in addition to information processing resources such as a CPU, a ROM and a RAM, a display device for displaying a UI screen and various types of information for making various settings to the first to third migration source storage apparatuses 112 to 114 and the migration destination storage apparatus 111, an input device such as a keyboard or a mouse to be used by an operator for performing various operations and various inputs for settings, and a communication device for communicating with the first to third migration source storage apparatuses 112 to 114 and the migration destination storage apparatus 111 via the LAN 116. Various types of processing are executed by the overall management apparatus 117 as described later as a result of the CPU executing the corresponding programs stored in the ROM and the like based on the respective commands that are input via the input device.

Note that FIG. 31 shows that the migration destination logical device 125 and the backup logical device 126 respectively corresponding to the migration destination logical device 50B (FIG. 5) and the backup logical device 50D (FIG. 5) of the first embodiment, the virtual device 127 corresponding to the virtual device 50F (FIG. 22) of the second embodiment, and the migration destination logical device 128 and the virtual device 129 respectively corresponding to the migration destination logical device 50B (FIG. 26) and the virtual device 50H (FIG. 26) of the third embodiment are provided in the migration destination storage apparatus 111.

When migrating the first migration source storage apparatus 112 to the migration destination storage apparatus 111 based on the first storage migration method, the migration destination logical device 125 in the migration destination storage apparatus 111 is mapped to the virtual device 121 in the first migration source storage apparatus 112, and, when migrating the second migration source storage apparatus 113 to the migration destination storage apparatus 111 based on the second storage migration method, the external logical device 123 of the external storage apparatus 115 is mapped to the virtual device 127 in the migration destination storage apparatus 111. Moreover, when migrating the third migration source storage apparatus 114 to the migration destination storage apparatus 111 based on the third storage migration method, the migration source logical device 124 in the third migration source storage apparatus 114 is migrated to the virtual device 129 in the migration destination storage apparatus 111.

Figure 32:
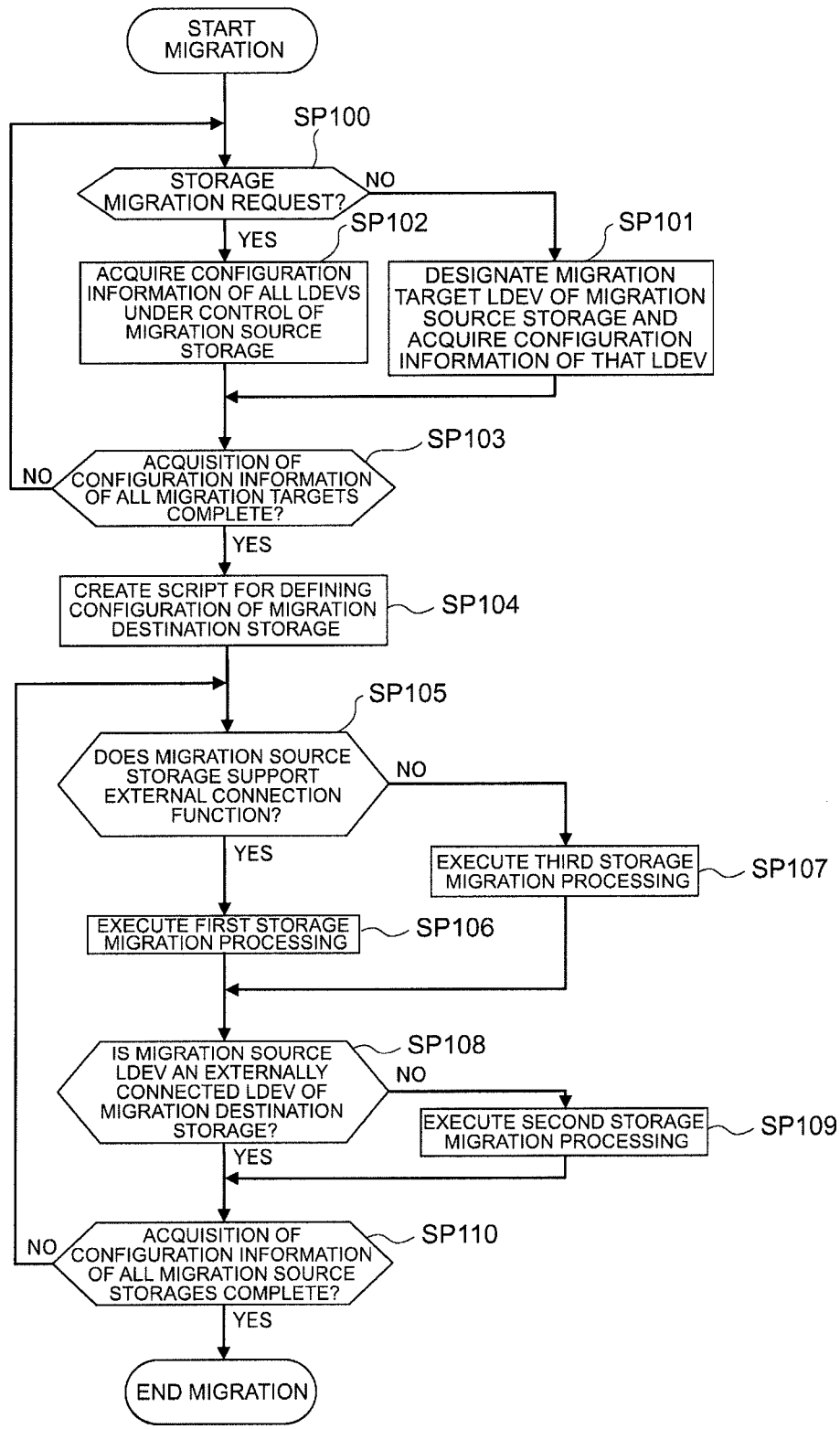
FIG. 32 is a flowchart showing the processing routine of the storage migration control processing.

FIG. 32 shows the processing routine of the storage migration control processing that is executed by the management apparatus 117 when the management apparatus 117 is operated in the computer system 110 and one migration source storage apparatus 112 to 114 is selected or one or more migration source logical devices in one migration source storage apparatus 112 to 114 are selected and the migration of such migration source storage apparatus 112 to 114 or migration source logical device to the migration destination storage apparatus 111 is commanded. Note that, since the foregoing first to third storage migration methods can also be applied to data migration in logical device units in addition to data migration in storage apparatus units, FIG. 32 also described data migration in logical device units.

The management apparatus 117 starts the storage migration control processing when the administrator commands the storage migration from the migration source storage apparatus 112 to 114 to the migration destination storage apparatus 111 or the storage migration in migration source logical device units in the migration source storage apparatus 112 to 114, and foremost determines whether the command provided from the administrator is for migrating a storage apparatus (SP100).

If the management apparatus 117 obtains a negative result in the foregoing determination, it sends to the migration source storage apparatus 112 to 114 an Inquiry request targeting one among the migration source logical devices in the migration source storage apparatus 112 to 114 that was selected as the data migration target by the administrator (SP101). Consequently, according to this Inquiry request, the apparatus-specific information related to the migration source logical device designated in the Inquiry request (that is, the WWPN of the port connected to that migration source logical device, and the serial number and vendor ID of the migration source storage apparatus 112 to 114) is transferred from the migration source storage apparatus 112 to 114 to the management apparatus 117.

Meanwhile, if the management apparatus 117 obtains a positive result in the determination at step SP100, it sends to the migration source storage apparatus 112 to 114 an Inquiry request targeting one logical device among all logical devices (including virtual devices) existing under the control of the migration source storage apparatus 112 to 114 that was selected as the migration target by the administrator (SP102). Consequently, according to this Inquiry request, the apparatus-specific information relating to the migration source logical device designated in the Inquiry request is transferred from the migration source storage apparatus 112 to 114 to the management apparatus 117.

Subsequently, the management apparatus 117 determines whether the apparatus-specific information relating to all logical devices in all migration source storage apparatuses 112 to 114 to become the data migration target has been acquired (SP103). If the management apparatus 117 obtains a negative result in the foregoing determination, it returns to step SP103 and thereafter repeats the same processing from step SP100 to step SP103.

When the management apparatus 117 eventually obtains a positive result at step SP103 as a result of the apparatus-specific information relating to all logical devices to become the data migration target being acquired, it preliminarily creates a script that is required in the processing for the administrator to subsequently migrate all migration source logical devices in all migration source storage apparatuses 112 to 114 which were selected as the data migration target to the migration destination storage apparatus 111, respectively (SP104).

Subsequently, the management apparatus 117 selects on unprocessed migration source storage apparatus 112 to 114 among the migration source storage apparatus 112 to 114 which were selected as the data migration target, and determines whether such migration source storage apparatus 112 to 114 is equipped with the external connection function (SP105). Note that, as the determination method, for example, information showing whether that storage apparatus is equipped with the external connection function may be provided in advance to the management apparatus 117 for each vendor and each model of the storage apparatus, and the management apparatus 117 may make the foregoing determination based on such information.

If the management apparatus 117 obtains a positive result in the foregoing determination, it migrates the data from the migration source logical device to the migration destination logical device by executing the data migration which applies the first storage migration method described above with reference to FIG. 1 to FIG. 20 to each migration source logical device as the data migration target (SP106).

Meanwhile, if the management apparatus 117 obtains a negative result in the determination at step SP105, it migrates the data from the migration source logical device to the migration destination logical device by executing the data migration which applies the third storage migration method described above with reference to FIG. 26 to FIG. 30 to each migration source logical device as the data migration target (SP107).

Subsequently, the management apparatus 117 determines whether the migration source storage apparatus 112 to 114 includes the externally connected external storage apparatus 115 (SP108). If the management apparatus 117 obtains a negative result in the foregoing determination it proceeds to step SP110. Meanwhile, if the management apparatus 117 obtains a positive result in the foregoing determination, it executes the data migration which applies the second storage migration method described above with reference to FIG. 21 to FIG. 25 to each migration source logical device as the data migration target (SP109).

Subsequently, the management apparatus 117 determines whether data migration to the migration destination storage apparatus 111 is complete regarding all migration source storage apparatuses 112 to 114 in which a part or all of the migration source logical volumes were selected as the migration target by the administrator (SP110).

If the management apparatus 117 obtains a negative result in the foregoing determination, it returns to step SP105, and thereafter repeats the processing from step SP105 to step SP110 while sequentially changing the migration source storage apparatus 112 to 114 selected at step SP105 to another migration source storage apparatus 112 to 114.

When the management apparatus 117 eventually obtains a positive result at step SP10 as a result of data migration to the migration destination storage 111 being completed regarding all migration source storage apparatuses 112 to 114 selected by the administrator, it ends the storage migration control processing.

As described above, according to this embodiment, in addition to the effects obtained in the first embodiment, a plurality of migration source storage apparatuses can be migrated to one migration destination storage apparatus.

(5) Other Embodiments

Note that, although the foregoing first to fourth embodiments explained a case of applying an Inquiry request of the SCSI standard as the configuration information acquisition request to be issued by the host computer 2 for acquiring the configuration information from the migration source storage apparatuses 3A, 91A, 101A or the migration destination storage apparatuses 3B, 91B, 101B, the present invention is not limited thereto, and other commands may also be applied.

INDUSTRIAL APPLICABILITY

The present invention can be broadly applied to various computer system configured from a host computer and a storage apparatus.

REFERENCE SIGNS LIST 1, 90, 100, 110 . . . computer system, 2 . . . host computer, 3A, 91A, 101A, 112 to 114 . . . migration source storage apparatus, 3B, 91B, 101B, 111 . . . migration destination storage apparatus, 4, 94, 103, 117 . . . management apparatus, 10A, 10B . . . storage device, 21A, 12B, 95A, 95B, 102A, 102B . . . control processor, 30A, 30B, 111A to 115A . . . port, 50A, 120, 124 . . . migration source logical device, 50B, 125, 128 . . . migration destination logical device, 50C, 50F to 50H, 121, 122, 127, 129 . . . virtual device, 50D, 126 . . . backup logical device, 51 . . . virtualization information, 60 . . . logical device management table, 61 . . . virtual device management table, 62 . . . external device information table, 63 . . . pair management information table, 64 . . . path management table, 92, 115 . . . external storage apparatus, 93, 123 . . . external logical device.

The invention claimed is:

1. A computer system including a host computer and a first storage apparatus for providing to the host computer a first storage area to be used for reading and writing data, wherein the host computer identifies the first storage apparatus based on apparatus-specific information of the first storage apparatus that is notified from the first storage apparatus in response to a configuration information acquisition request sent from the host computer to the first storage apparatus, comprising:

a second storage apparatus to which data stored in the first storage area of the first storage apparatus is migrated; and a management apparatus for managing data migration from the first storage apparatus to the second storage apparatus, wherein the management apparatus controls the first and/or second storage apparatus so as to synchronize a data content in the first storage area of the first storage apparatus and a data content in a second storage area of the second storage apparatus associated with the first storage area, and acquires the apparatus-specific information of the first storage apparatus from the first storage apparatus and notifies the acquired apparatus-specific information to the second storage apparatus, and wherein the second storage apparatus sets, as virtualization information, the acquired apparatus-specific information of the first storage apparatus notified from the management apparatus to a path connecting the second storage area and a second port associated with the second storage area in the second storage apparatus, and notifies the virtualization information as its own apparatus-specific information to the host computer in response to the configuration information acquisition request from the host computer, wherein the first storage apparatus provides to the host computer a first virtual storage area which is a virtualization of a third storage area in an externally connected third storage apparatus, wherein the management apparatus acquires from the first storage apparatus the apparatus-specific information of the first storage apparatus including information related to a third port connected to the first virtual storage area in the first storage apparatus, and notifies the acquired apparatus-specific information to the second storage apparatus, and wherein the second storage apparatus sets, as the virtualization information, the apparatus-specific information notified from the management apparatus to a path connecting a second virtual storage area provided in correspondence with the first virtual storage area in the first storage apparatus and a fourth port associated with the second virtual storage area in the second storage apparatus, and notifies the virtualization information as its own apparatus-specific information to the host computer in response to the configuration information acquisition request from the host computer.

2. The computer system according to claim 1, wherein the apparatus-specific information of the first storage apparatus includes a network address of a port of the first storage apparatus connected to the first storage area, a serial number of the first storage apparatus, and a vendor identifier of the first storage apparatus.

3. The computer system according to claim 1, wherein the management apparatus maps the second storage area of the second storage apparatus as a first external storage area to the first storage apparatus, and synchronizes the data content in the first storage area and the data content in the second storage area by controlling the first storage apparatus to configure the first external storage area and the first storage area as a copy pair.

4. The computer system according to claim 1, wherein the management apparatus maps the first storage area of the first storage apparatus as a second external storage area to the second storage apparatus, and synchronizes the data content in the first storage area and the data content in the second storage area by controlling the second storage apparatus to configure the second external storage area and the second storage area as a copy pair.

5. The computer system according to claim 1, wherein the apparatus-specific information of the first storage apparatus includes a network address of a port of the first storage apparatus connected to the first storage area, a serial number of the first storage apparatus, and a vendor identifier of the first storage apparatus, wherein the management apparatus maps the second storage area of the second storage apparatus as a first external storage area to the first storage apparatus, and synchronizes the data content in the first storage area and the data content in the second storage area by controlling the first storage apparatus to configure the first external storage area and the first storage area as a copy pair, wherein the first storage apparatus provides to the host computer a first virtual storage area which is a virtualization of a third storage area in an externally connected third storage apparatus, wherein the management apparatus acquires from the first storage apparatus an address of a third port connected to the first virtual storage area in the first storage apparatus, and the serial number and the vendor identifier of the first storage apparatus, and notifies the acquired third port address, and the serial number and the vendor identifier of the first storage apparatus to the second storage apparatus, and wherein the second storage apparatus sets, as the virtualization information, the third port address, and the serial number and the vendor identifier of the first storage apparatus notified from the management apparatus to a path connecting a second virtual storage area provided in correspondence with the first virtual storage area in the first storage apparatus and a fourth port associated with the second virtual storage area in the second storage apparatus, and notifies the virtualization information as its own apparatus-specific information to the host computer in response to the configuration information acquisition request from the host computer.

6. A storage migration method in a computer system including a host computer and a first storage apparatus for providing to a host computer a first storage area to be used for reading and writing data, wherein the host computer identifies the first storage apparatus based on apparatus-specific information of the first storage apparatus that is notified from the first storage apparatus in response to a configuration information acquisition request sent from the host computer to the first storage apparatus, wherein the computer system comprises:

a second storage apparatus to which data stored in the first storage area of the first storage apparatus is migrated; and a management apparatus for managing data migration from the first storage apparatus to the second storage apparatus, and wherein the storage migration method comprises:

a first step of the management apparatus controlling the first and/or second storage apparatus so as to synchronize a data content in the first storage area of the first storage apparatus and a data content in a second storage area of the second storage apparatus associated with the first storage area, and acquiring the apparatus-specific information of the first storage apparatus from the first storage apparatus and notifying the acquired apparatus-specific information to the second storage apparatus; and a second step of the second storage apparatus setting, as virtualization information, the acquired apparatus-specific information of the first storage apparatus notified from the management apparatus to a path connecting the second storage area and a second port associated with the second storage area in the second storage apparatus, and notifying the virtualization information as its own apparatus-specific information to the host computer in response to the configuration information acquisition request from the host computer, wherein the first storage apparatus provides to the host computer a first virtual storage area which is a virtualization of a third storage area in an externally connected third storage apparatus, wherein, at the first step, the management apparatus acquires from the first storage apparatus the apparatus-specific information of the first storage apparatus including information related to a third port connected to the first virtual storage area in the first storage apparatus, and notifies the acquired apparatus-specific information to the second storage apparatus, and wherein, at the second step, the second storage apparatus sets, as the virtualization information, the acquired apparatus-specific information notified from the management apparatus to a path connecting a second virtual storage area provided in correspondence with the first virtual storage area in the first storage apparatus and a fourth port associated with the second virtual storage area in the second storage apparatus, and notifies the virtualization information as its own apparatus-specific information to the host computer in response to the configuration information acquisition request from the host computer.

7. The storage migration method according to claim 6, wherein the apparatus-specific information of the first storage apparatus includes a network address of a port of the first storage apparatus connected to the first storage area, a serial number of the first storage apparatus, and a vendor identifier of the first storage apparatus.

8. The storage migration method according to claim 6, wherein, at the first step, the management apparatus maps the second storage area of the second storage apparatus as a first external storage area to the first storage apparatus, and synchronizes the data content in the first storage area and the data content in the second storage area by controlling the first storage apparatus to configure the first external storage area and the first storage area as a copy pair.

9. The storage migration method according to claim 6, wherein, at the first step, the management apparatus maps the first storage area of the first storage apparatus as a second external storage area to the second storage apparatus, and synchronizes the data content in the first storage area and the data content in the second storage area by controlling the second storage apparatus to configure the second external storage area and the second storage area as a copy pair.

10. The storage migration method according to claim 6, wherein the apparatus-specific information of the first storage apparatus includes a network address of a port of the first storage apparatus connected to the first storage area, a serial number of the first storage apparatus, and a vendor identifier of the first storage apparatus, wherein, at the first step, the management apparatus maps the second storage area of the second storage apparatus as a first external storage area to the first storage apparatus, and synchronizes the data content in the first storage area and the data content in the second storage area by controlling the first storage apparatus to configure the first external storage area and the first storage area as a copy pair, wherein the first storage apparatus provides to the host computer a first virtual storage area which is a virtualization of a third storage area in an externally connected third storage apparatus, wherein, at the first step, the management apparatus acquires from the first storage apparatus an address of a third port connected to the first virtual storage area in the first storage apparatus, and the serial number and the vendor identifier of the first storage apparatus, and notifies the acquired third port address, and the serial number and the vendor identifier of the first storage apparatus to the second storage apparatus, and wherein, at the second step, the second storage apparatus sets, as the virtualization information, the third port address, and the serial number and the vendor identifier of the first storage apparatus notified from the management apparatus to a path connecting a second virtual storage area provided in correspondence with the first virtual storage area in the first storage apparatus and a fourth port associated with the second virtual storage area in the second storage apparatus, and notifies the virtualization information as its own apparatus-specific information to the host computer in response to the configuration information acquisition request from the host computer.

* * * * *